US012354210B2

(12) United States Patent
Hulm

(10) Patent No.: US 12,354,210 B2
(45) Date of Patent: Jul. 8, 2025

(54) SYSTEMS AND METHODS FOR RAY TRACED OCCLUSION AND REFLECTIONS

(71) Applicant: Electronic Arts Inc., Redwood City, CA (US)

(72) Inventor: Dustin Hulm, Seattle, WA (US)

(73) Assignee: Electronic Arts Inc., Redwood City, CA (US)

( * ) Notice: Subject to any disclaimer, the term of this patent is extended or adjusted under 35 U.S.C. 154(b) by 292 days.

(21) Appl. No.: 17/710,416

(22) Filed: Mar. 31, 2022

(65) Prior Publication Data
US 2023/0316629 A1    Oct. 5, 2023

(51) Int. Cl.
*G06T 15/06*    (2011.01)
*G06T 15/00*    (2011.01)
*G06T 15/40*    (2011.01)
*G06T 15/50*    (2011.01)

(52) U.S. Cl.
CPC ............ *G06T 15/06* (2013.01); *G06T 15/005* (2013.01); *G06T 15/40* (2013.01); *G06T 15/50* (2013.01); *G06T 2215/12* (2013.01)

(58) Field of Classification Search
None
See application file for complete search history.

(56) References Cited

U.S. PATENT DOCUMENTS

2016/0260247 A1* 9/2016 Fursund ................ G06T 15/506

OTHER PUBLICATIONS

Morgan McGuire, Michael Mara, "Efficient GPU Screen-Space Ray Tracing", 2014, Journal of Computer Graphics Techniques, vol. 3, No. 4, pp. 73-85.*
Tobias Ritschel, Thorsten Grosch, Hans-Peter Seidel, "Approximating Dynamic Global Illumination in Image Space", Feb. 27, 2009, ACM, I3D '09: Proceedings of the 2009 symposium on Interactive 3D graphics and games, pp. 75-82.*
Thomas Willberger, Clemens Musterle, Stephan Bergmann, "Deferred Hybrid Path Tracing", Feburary 26, 2019, Apress, Ray Tracing Gems, Chapter 26, pp. 475-492.*
O. Klehm, T. Ritschel, E. Eisemann, H.-P. Seidel, "Bent Normals and Cones in Screen-Space", 2011, Eurographics Association, Vision, Modeling, and Visualization.*
S. Herholz, T. Schairer, A. Schilling, W. Straßer, "Screen Space Spherical Harmonic Occlusion", 2012, Eurographics Association, Vision, Modeling, and Visualization.*

(Continued)

*Primary Examiner* — Robert Bader
(74) *Attorney, Agent, or Firm* — Leydig, Voit & Mayer, Ltd.

(57) ABSTRACT

A method, device, and computer-readable storage medium for generating an occlusion value for a pixel. The method includes: selecting a pixel in an image of a scene; identifying at least one direction to cast a fixed-distance ray from a location on an object corresponding to the pixel based on an orientation of a surface of the object at the location; in response to determining that screen space occlusion data is available in the at least one direction, obtaining an occlusion value for the pixel from at least one lighting probe based on the at least one direction; and in response to determining that screen space occlusion data is not available in the at least one direction, obtaining the occlusion value for the pixel based on performing ray tracing from the location on the object corresponding to the pixel.

20 Claims, 19 Drawing Sheets

(56) References Cited

OTHER PUBLICATIONS

Zander Majercik, Jean-Philippe Guertin, Derek Nowrouzezahrai, Morgan McGuire, "IrradianceField_generateRandomRays.pix", 2019, Journal of Computer Graphics Techniques, vol. 8, No. 2, acquired from supplementary material published with "Dynamic Diffuse Global Illumination with Ray-Traced Irradiance Fields".*

Matt Pharr, Simon Green, "Ambient Occlusion", 2004, Nvidia, GPU Gems 1, pp. 279-292.*

Bradford James Loos, Peter-Pike Sloan, "Volumetric Obscurance", Febrary 19, 2010, ACM, I3D '10: Proceedings of the 2010 ACM SIGGRAPH symposium on Interactive 3D Graphics and Games, pp. 151-156.*

Samuli Laine, Tero Karras, "Two Methods for Fast Ray-Cast Ambient Occlusion", Aug. 26, 2010, Eurographics, Computer Graphics Forum, vol. 29, Issue 4, pp. 1325-1333.*

Majercik et al. "Dynamic Diffuse Global Illumination with Ray-Traced Irradiance Fields," *Journal of Computer Graphics Techniques,* vol. 8, No. 2 (2019).

McGuire et al. "Real-Time Global Illumination using Precomputed Light Field Probes," *2017 ACM Symposium on Interactive 3D Graphics and Games* (Feb. 1, 2017).

McGuire et al. "Dynamic Diffuse Global Illumination," *Part 3: DDGI Overview, Casual Effects* (May 3, 2019) (available at: https://morgan3d.github.io/articles/2019-04-01-ddgi/overview.html).

* cited by examiner

SYSTEMS AND METHODS FOR RAY TRACED OCCLUSION AND REFLECTIONS

FIELD

This disclosure generally relates to computer graphics and, more particularly, to systems and methods for ray traced occlusion and reflections.

BACKGROUND

Computer-generated images are often created by examining a geometric model of a view space and modeled objects in the view space. The geometric model of the objects can have arbitrary resolution, but typically each object is represented by a finite number of polygons, such as triangles, positioned in the view space and having a color, color pattern, and/or texture over their surface. An image is typically output (e.g., stored, displayed, transmitted, or otherwise processed) as a pixel array.

One common feature of computer-generated images is to include reflections in the image that is output. Including reflections provides for more visually realistic results. In certain applications, such as animated films, ray tracing techniques can be used to provide ray traced reflections, which gives good results. However, ray tracing is computationally expensive. For complex scenes, it may take hours or days to renders a single frame of a video sequence using ray traced reflections, even when using very powerful computers or render farms.

Another common feature of computer-generated images is utilizing ambient occlusion as a shadowing technique to make three-dimensional (3D) objects look more realistic by simulating the soft shadows that should naturally occur when indirect or ambient lighting is cast out onto the scene. Ray traced ambient occlusion shading is actually fake indirect shadows that are added into the image that is output by rays that get cast out from each surface on the geometry. If the rays from a given area come into contact with another surface, that area will become darker. If they rays do not intersect another surface, the area will stay brighter. These soft ambient occlusion shadows help to define and separate the objects in the scene and add another level of realism to the render.

In certain applications, such as video games, computational speed is a priority. In video games, frames are rendered very quickly, e.g., in real-time or near real-time, as a user interacts with a video game. As such, ray tracing techniques for reflections and/or ambient occlusion (which can take hours or days to render a single frames) are not suitable for video games. For this reason, various other techniques have been developed to render reflections and simulate ambient occlusion in video games in real-time or near-real time. However, these other techniques suffer from poor quality, particularly when compared to the reflections and ambient occlusion obtained from full ray tracing.

As such, there remains a need in the art for a system and method for rendering reflections and ambient occlusion that overcome the drawbacks and limitations of existing approaches.

SUMMARY

Embodiments of the disclosure provide a method, device, and computer-readable storage medium for generating an occlusion value for a pixel. The method includes: selecting a pixel in an image of a scene; identifying at least one direction to cast a fixed-distance ray from a location on an object corresponding to the pixel based on an orientation of a surface of the object at the location; in response to determining that screen space occlusion data is available in the at least one direction, obtaining an occlusion value for the pixel from at least one lighting probe based on the at least one direction; and in response to determining that screen space occlusion data is not available in the at least one direction, obtaining the occlusion value for the pixel based on performing ray tracing from the location on the object corresponding to the pixel.

One embodiment of the disclosure provides a method for obtaining the occlusion value based on bent normals. The method includes: computing a bent normal for the location on the object corresponding to the pixel, wherein the bent normal is an average of all directions that are not occluded by shooting fixed-distance rays in a plurality of directions from the location on the object; wherein determining that screen space occlusion data is available in the at least one direction, comprises determining that screen space occlusion data is available in the direction of the bent normal; and wherein obtaining the occlusion value for the pixel from the at least one lighting probe comprises obtaining the occlusion value from a lighting probe based on the direction of the bent normal.

Another embodiment of the disclosure provides a method for obtaining the occlusion value based on determining a material property of the object corresponding to the pixel, wherein the material property comprises a surface roughness value of the object at the pixel; identifying a set of directions to cast fixed-distance rays from the location on the object corresponding to the pixel, wherein the set of directions includes random directions, and wherein the set of directions includes a specular direction in response to the surface roughness value of the object at the pixel being less than a specular roughness threshold; for each direction in the set of directions, casting a fixed-distance ray in the direction and determining whether the fixed-distance ray intersects another object along a length of the fixed-distance ray; for each direction in the set of directions in which the fixed-distance ray for the direction does not intersect another object along the length of the fixed-distance ray, obtaining a screen space reflection value for the direction based on one or more lighting probes that include directional lighting information; for each direction in the set of directions in which the fixed-distance ray for the direction does intersect another object along the length of the fixed-distance ray, obtaining a ray traced space reflection value for the direction based on casting a full length ray traced ray in the direction; and accumulating the screen space reflection values and the ray traced space reflection values corresponding to the directions in the set of directions to obtain the occlusion value for the pixel.

Another embodiment of the disclosure provides a method for obtaining the occlusion value based on reflection information comprising: determining that the surface roughness value of the object at the pixel corresponds to a high gloss surface based on determining that the surface roughness value is below a high gloss surface threshold; determining that the location on the object corresponding to the pixel corresponds to a brightness value that exceeds a brightness threshold; based on determining that the surface roughness value of the object at the pixel corresponds to a high gloss surface and based on determining that location on the object corresponding to the pixel corresponds to a brightness value that exceeds the brightness threshold, launching a reflection ray from the location on the object corresponding to the pixel to determine a reflection value for the pixel; and blending the occlusion value for the pixel and the reflection value for the pixel to obtain an updated occlusion value.

Another embodiment of the disclosure provides a method for updating lighting probes, comprising: calculating an average luminance of each lighting probe visible in a first frame; calculating the average luminance of each lighting probe visible in a second frame that is also visible in the first frame, wherein the second frame is sequentially after the first frame; for each lighting probe visible in both the first frame and the second frame, computing how much the average luminance changed for the lighting probe from the first frame to the second frame; for each lighting probe visible in both the first frame and the second frame, determining whether the change in average luminance is below a luminance threshold; for any lighting probes visible in the second frame that are also visible in the first frame where the change in average luminance is below the luminance threshold, bypassing updating lighting information stored in the lighting probe for the second frame and reusing the lighting information for the lighting probe from the first frame in the second frame; and for any lighting probes visible in the second frame that are also visible in the first frame where the change in average luminance is above the luminance threshold and for any lighting probes in the second frame that are not visible in the first frame, computing updated lighting information for the lighting probes for the second frame.

DETAILED DESCRIPTION

Figure 1:
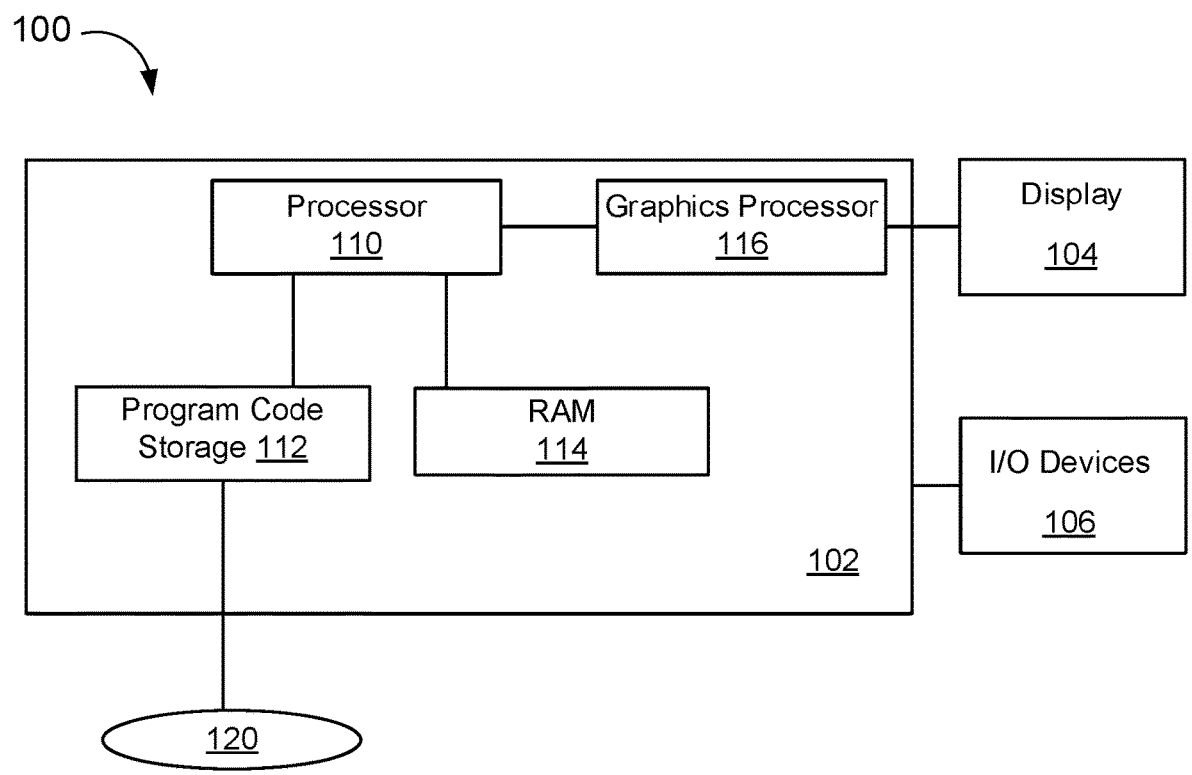
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Ray tracing is a costly feature to implement in video games, even with ray tracing accelerated hardware. Since the computation budget for ray tracing is limited, existing implementations often require a compromise on frame rate, resolution, or other aspects to run efficiently. Embodiments of the disclosure provide and improvement to the light probe technique of dynamic diffuse global illumination (DDGI), which enables real time ray traced reflections and ambient occlusion to be performed with less computational cost (e.g., fewer rays cast).

One embodiment improves upon DDGI by storing high resolution radiance probe data and adding a new sampling method that uses a combination of screen space and ray traced occlusion data with importance sampling to add local lighting detail. A custom probe sampling pass generates a set of sample directions per pixel using the importance sampling, such as using the material bidirectional reflectance distribution function (BRDF). A custom screen space ambient occlusion pass is run that traces these sample directions. When there is a lack of screen space ambient occlusion data, a ray is cast to ensure accurate local occlusion.

Another embodiment improves upon DDGI by adding specular data to sample probes, and more cost-efficiently using ray casting for ambient occlusion (AO) and reflections. During the pass of the custom AO, a bent normal term is calculated to bridge the gap between the probe data and the localized geometry, as it indicates which direction each respective pixel can see out. This helps calculate the average bounce diffuse and thereby acquire information about instances of local light bleeding. This is in turn used to determine when there is a lack of screen space ambient occlusion data. When there is a lack of screen space ambient occlusion data, a single ray is casted in the direction of the bent normal to obtain more data in order to ambiently occlude the space.

Still further embodiments of the disclose provide for ray traced reflections. The screen space ambient occlusion techniques disclosed herein already contain some reflection information. According to embodiments of the disclosure, surfaces to be shaded can be examined to determine whether the screen space ambient occlusion provides enough reflection information, and ray tracing can be bypassed for these areas. In one implementation, a surface roughness is utilized for this test, such that glossy surfaces (e.g., with a surface roughness below a threshold) are ray traced. Additionally, in some embodiments, brightness information is also examined, such that that dark areas that would not receive a perceptible benefit from ray traced reflections are also skipped for ray tracing, even if the surface is glossy.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time in response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
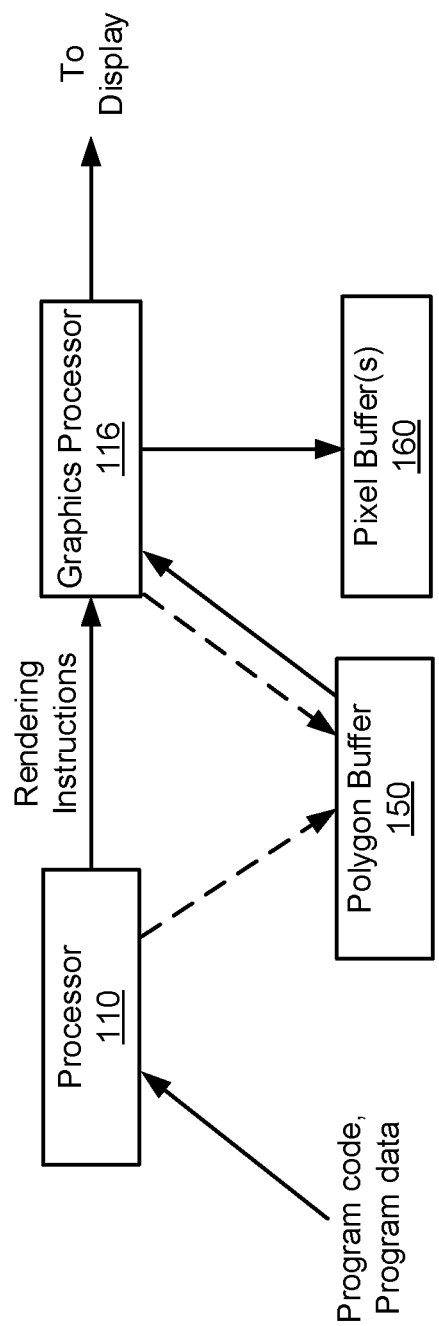
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
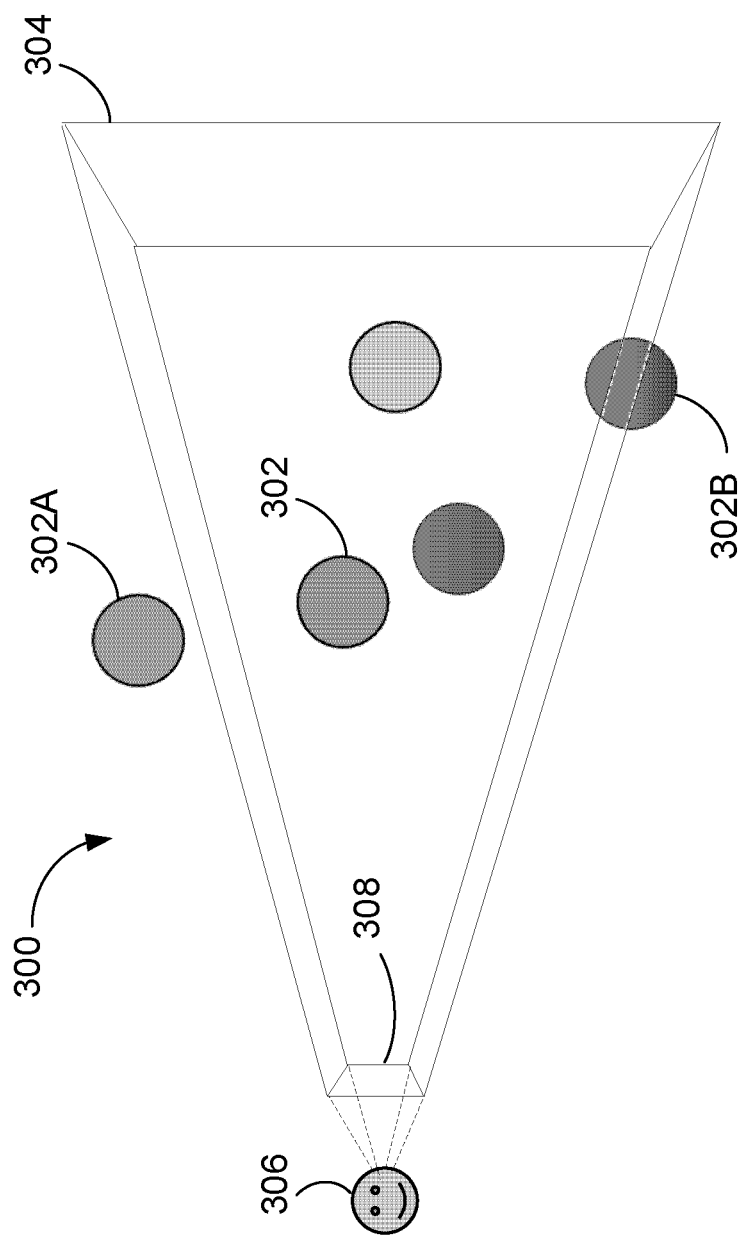
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (e.g., the image represented by screen space 308) can change as the camera 306 moves in 3D space relative to the objects in the scene. Also, the objects can move in the scene 300.

Figure 4B:
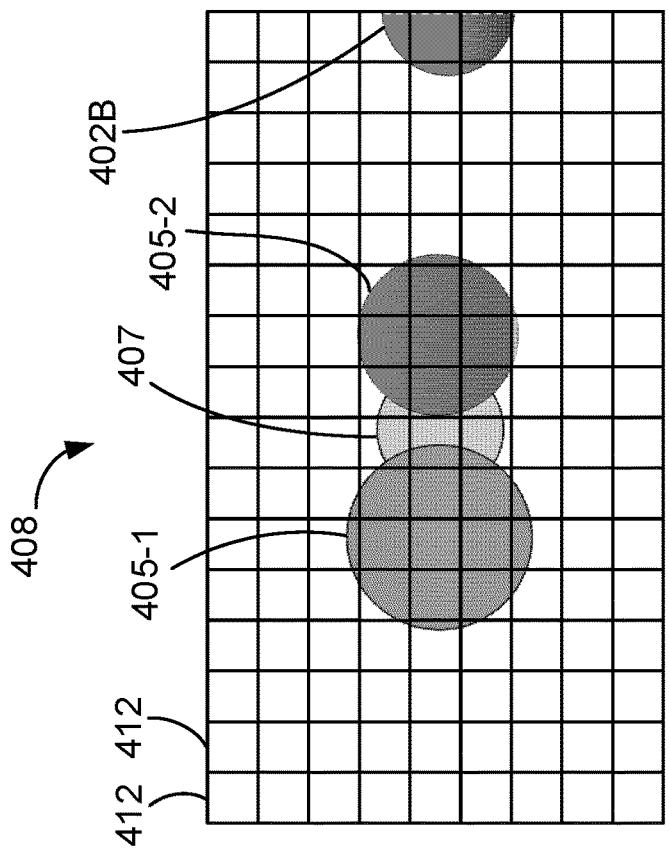
FIG. 4B is an example of an image of a scene, according to one embodiment.
Figure 4A:
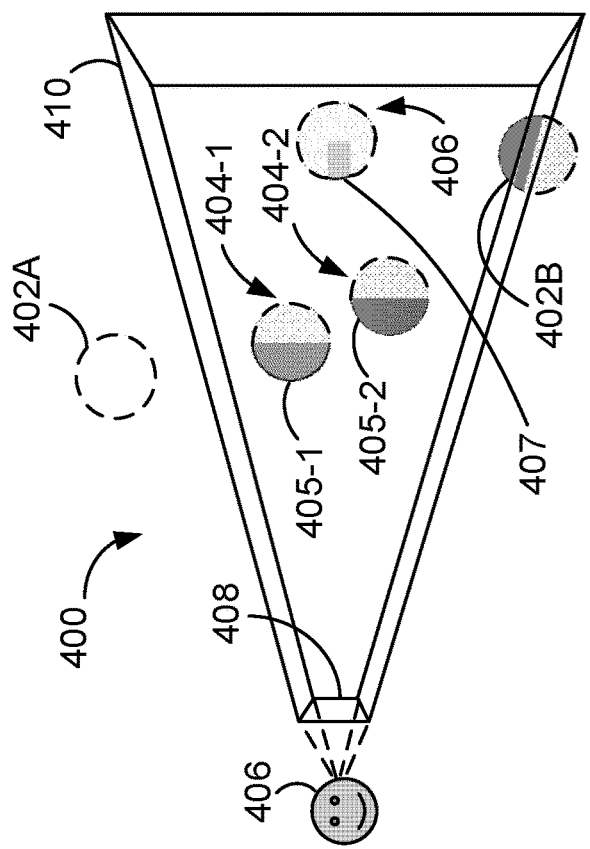
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion of objects that cannot be seen by the camera 406. For example, backface culling removes portions 404-1 and 404-2 of objects 405-1 and 405-2, respectively. In some embodiments, depth testing can be performed to remove, on a per pixel basis in screen space 408, portions of objects that are occluded by other objects. For example, depth testing removes portion 406 of object 407 that is occluded by objects 405-1 and 405-2.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
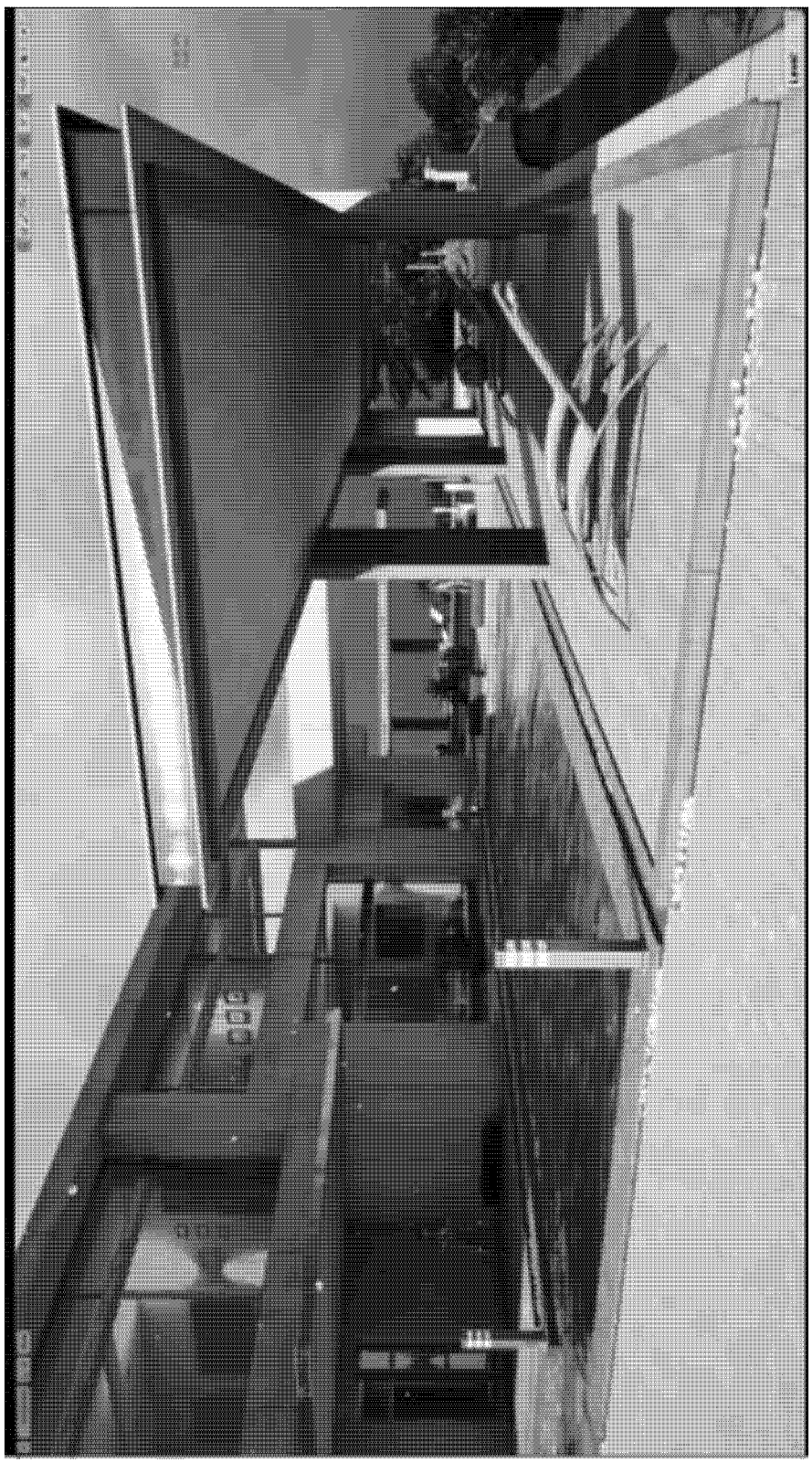
FIG. 5 is a screenshot of an image to be rendered, according to one embodiment.
Figure 6:
FIG. 6 is a screenshot of an image to be rendered with a set of probes overlaid on the image, according to one embodiment.

FIG. 5 is a screenshot of an image to be rendered, according to one embodiment. FIG. 6 is a screenshot of an image to be rendered with a set of probes 600 overlaid on the image, according to one embodiment. In one embodiment, the probes 600 are light probes placed in an axis-uniform 3D grid pattern in world space. For example, the probes 600 may be placed on a regular grid one to two meters apart from one another in world space. Any other spacing may also be used. In some implementations, the probe density can be increased for higher-quality results. Or, in some embodiments, the probe locations can be optimized for higher-quality results at the same memory and computation limits. Still further embodiments place probes 600 in cascaded groups to cover large regions.

Figure 7:
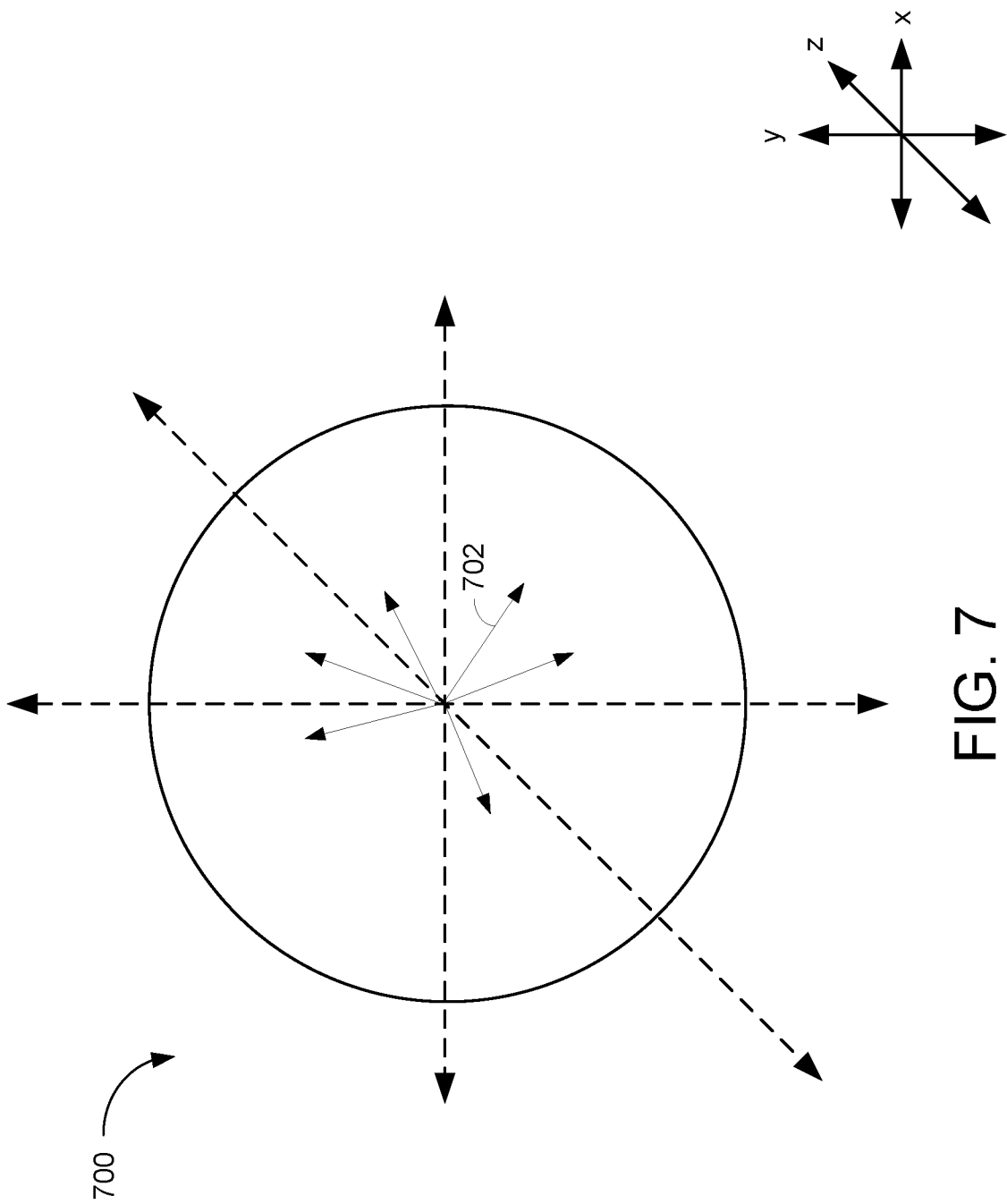
FIG. 7 is a conceptual diagram illustrating a probe, according to one embodiment.

FIG. 7 is a conceptual diagram illustrating a probe 700, according to one embodiment. In some embodiments, each probe is configured to cast rays 702 in random directions and store lighting information to gather lighting information corresponding to the direction of the ray 702. Lighting information may include, for example, color of the light that is coming towards the probe 700 in the direction of the ray 702. In the example shown in FIG. 7, six rays are cast in random directions. In other embodiment, any number of rays can be cast per probe.

In conventional DDGI approaches, light probes are used as a way of sampling the environment for light information to create indirect illumination and reflections by baking it into the probes beforehand. The lighting information gathered from each ray cast is accumulated into a texture (e.g., a 6×6 or 8×8 texture map). In conventional approaches, the accumulated lighting is averaged across all directions of the probe to pre-calculate diffuse lighting (e.g., irradiance). For a given pixel being shaded, the nearby irradiance probes can be referenced to accumulate a diffuse lighting component for the pixel.

Figure 8:
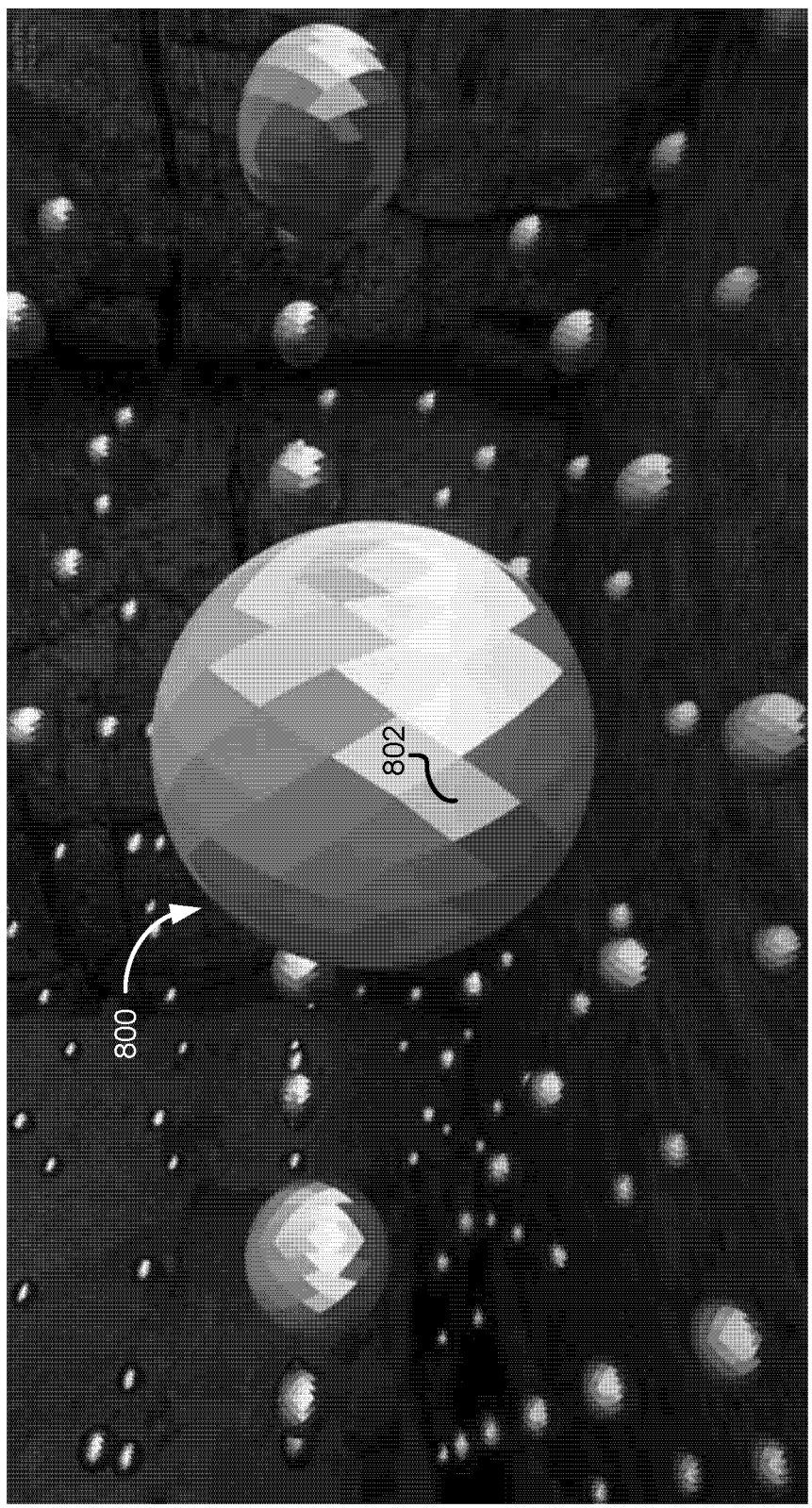
FIG. 8 is a screenshot of a probe with lighting information, according to one embodiment.

In contrast to conventional DDGI approaches, some embodiments of the disclosure store high resolution, direction-dependent radiance data in the probes (not averaged irradiance). FIG. 8 is a screenshot of a probe 800 with lighting information, according to one embodiment. A set of rays is cast in random directions from the probe 800. Lighting information resulting from casting the set of rays is stored in a data structure corresponding to the probe for the respective directions. Interpolation can be used to determine lighting information for directions among nearby rays being cast. The lighting information stored in the probe 800 can be visualized, as shown in FIG. 8, by panels 802 of the probe 800 that represent the lighting information (e.g., color) of light incident on the probe from various directions. Embodiments of the disclosure increase the resolution of the probes (for example, a 16×16 texture) and provide probes with raw radiance values of direct lighting, which results in a cost-efficient use of ray casting for occlusion and reflections.

Figure 9:
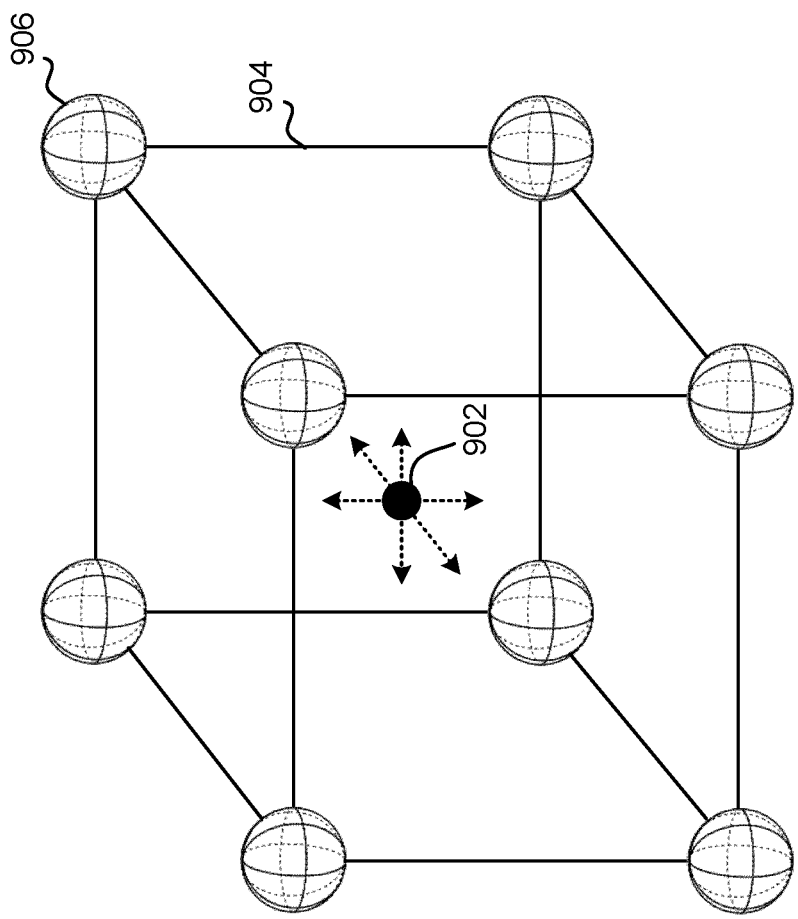
FIG. 9 is a conceptual diagram illustrating a location on an object in relation to its eight nearest probes, according to one embodiment.

FIG. 9 is a conceptual diagram illustrating a point 902 in space in relation to its eight nearest probes, according to one embodiment. Each point in space is associated with a "cage" 904 of vertices corresponding to the eight vertices of a grid cell in the grid of probes that contains the point 902. Each vertex of the cage 904, thus, corresponds to a location of a probe 906 in the grid of probes.

Figure 10:
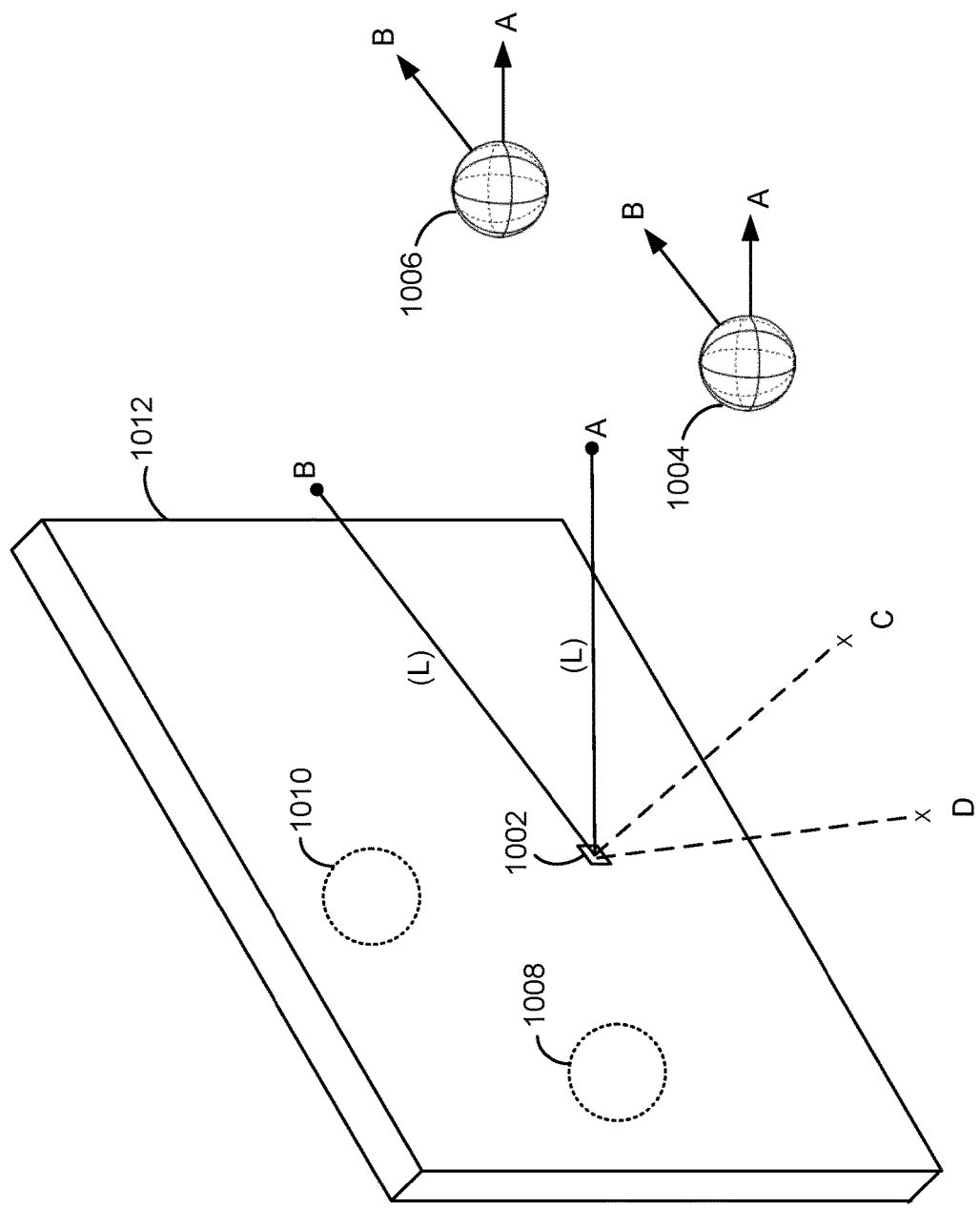
FIG. 10 is a conceptual diagram illustrating casting rays in multiple directions from a location on an object, according to one embodiment.

FIG. 10 is a conceptual diagram illustrating casting rays in multiple directions from a location on an object, according to one embodiment. For each pixel in an image to be shaded, such as pixel 1002, a location on an object corresponding to the pixel 1002 is determined. In one embodiment, a set of fixed-distance rays is cast from the location on the object corresponding to the pixel 1002. In one implementation, the set of fixed-distance rays includes four (4) fixed-distance rays, although any number of rays can be used. As described in greater detail herein, embodiments of the disclosure compute a screen space local occlusion value for the pixel 1002 that includes both diffuse and specular components based on the fixed-distance rays. Ray tracing can be used to supplement the screen space information when needed.

According to the disclosed embodiments, the local occlusion determined for the pixel can include both diffuse and specular components. To include a specular component, one embodiment of the disclosure casts a single fixed-distance ray based on the specular direction. The remaining fixed-distance rays are cast in random directions to include a diffuse component.

Figure 11:
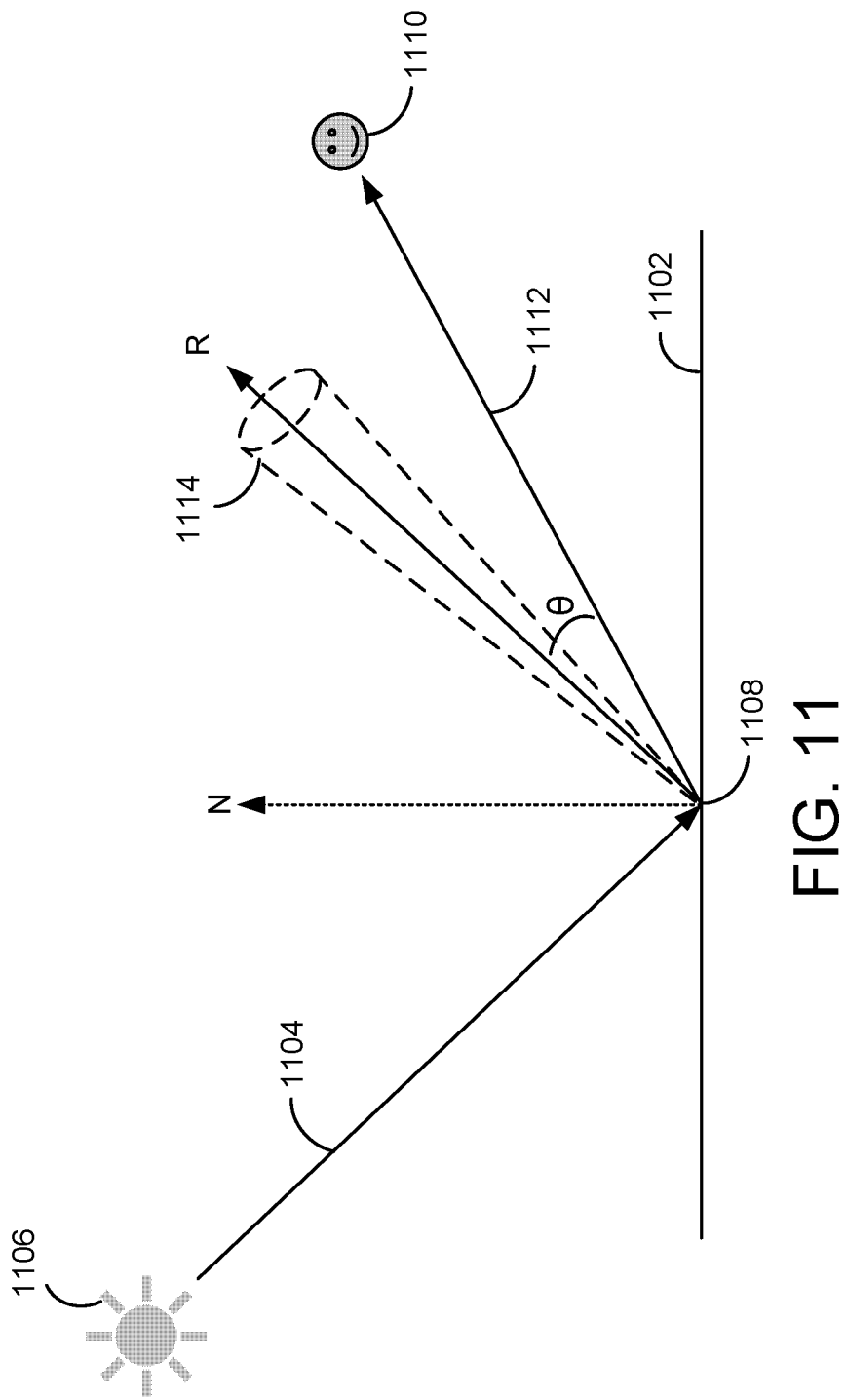
FIG. 11 is a conceptual diagram illustrating specular lighting, according to one embodiment.

FIG. 11 is a conceptual diagram illustrating specular lighting, according to one embodiment. Specular lighting simulates the bright spot of a light that appears on shiny objects. Specular highlights are more inclined to the color of the light than the color of the object. Light is cast from a light source 1106. With respect to a location 1108 on an object 1102, light is incident on the location 1108 from the light source 1106 in light direction 1104. A surface normal (N) can be determined at location 1108 based the orientation of the surface at the location 1108.

Similar to diffuse lighting, specular lighting is based on the light direction 1104 and the surface normal N, but also based on the view direction 1112, e.g., a location of a camera 1110 capturing the image of the scene that includes the location 1108. Specular lighting is also based on material properties of the surface of the object 1102. If the surface of the object is a mirror, the specular lighting is the strongest wherever a viewer would see the light reflected on the surface. A reflection vector R can be calculated by reflecting the light direction 1104 around the normal vector N. Then we calculate the angular distance θ between this reflection vector R and the view direction 1112. The closer the angular distance θ between reflection vector R and the view direction 1112, the greater the impact of the specular light. The resulting effect is that we see a bit of a highlight when we are looking at the light's direction reflected via the surface.

As described, the view direction 1112 is an extra variable used to determine specular lighting, which can be calculated using the location of the camera 1110 in world space relative to the location 1108 on the object 1102. The intensity of the specular component is determined based on the angular distance θ between reflection vector R and the view direction 1112, and this intensity can be multiplied by the light color and added to the ambient and diffuse components.

In the example shown in FIG. 11, the surface of the object 1102 is a glossy surface, thus a single reflection vector R is shown. If the surface of the object 1002 were rougher, the surface may include a plurality of microfacets, such that incident light is reflected from the surface in a distribution, represented by cone 1114.

Referring back to FIG. 10, for pixel 1002, material properties of the surface at the location on the object corresponding to pixel 1002 are determined. The material properties of the surface may comprises a roughness of the surface. Embodiments of the disclosure first determine whether a specular component of the ambient lighting should be included by comparing the surface roughness to a roughness threshold. If the surface roughness is below the roughness threshold, then it is determined that a specular component should be included. When selecting directions for a set of directions to cast rays, a first fixed-distance ray direction can be selected based on the specular direction (e.g., which is based on the location of the light source, the orientation of the surface, and the view direction, as described in FIG. 11). If the specular direction is formed by a distribution (e.g., a cone), a random direction is selected within the distribution (e.g., within the cone) for the specular direction. Then three additional fixed-distance ray directions are selected at random among a hemisphere of possible directions for rays from the surface, as described in greater detail in FIG. 12.

Figure 12:
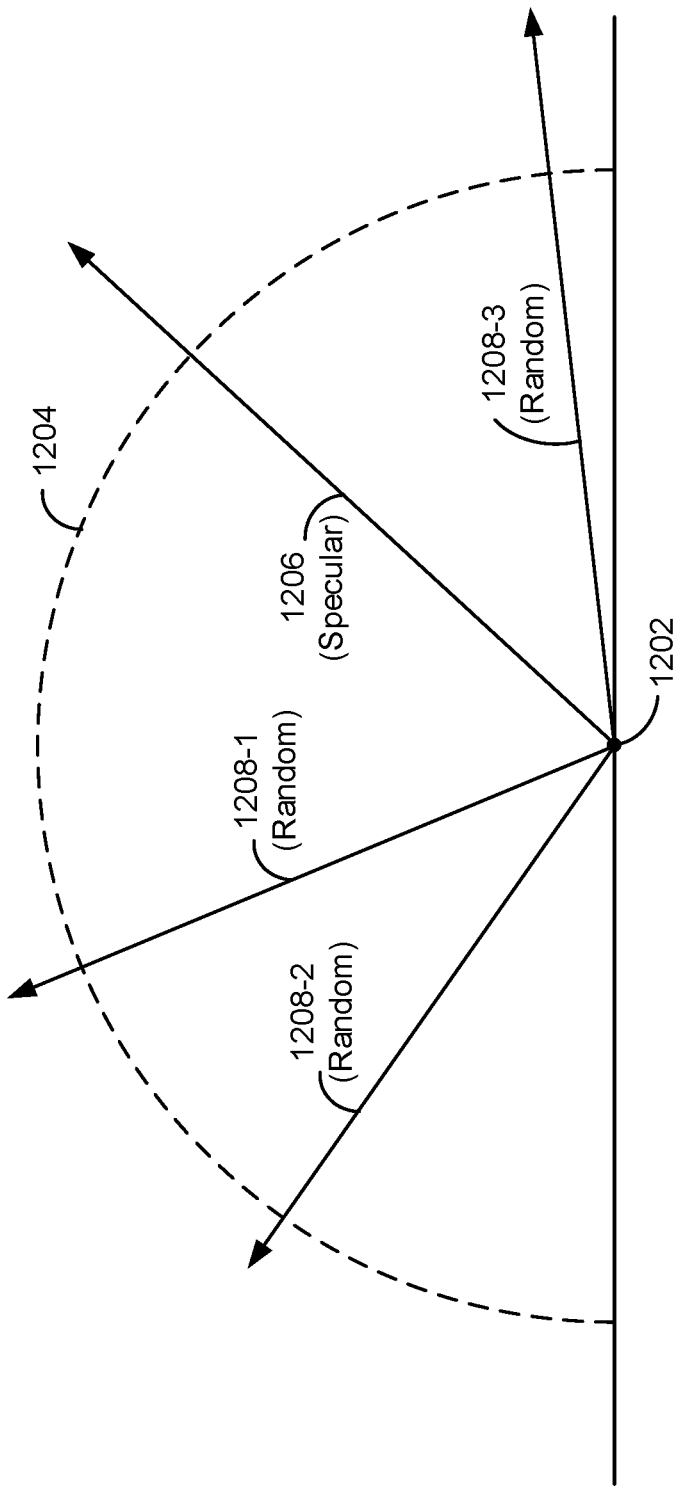
FIG. 12 is a conceptual diagram illustrating casting rays within a hemisphere from a location on an object, according to one embodiment.

FIG. 12 is a conceptual diagram illustrating casting rays within a hemisphere 1204 from a location 1202 on an object, according to one embodiment. A surface of an object defines a plane at the location 1202. A hemisphere of possible directions to cast rays can be determined based on the orientation of the plane at the surface. As described above, in some embodiments, if a specular component should be included based on the surface roughness, then a specular direction 1206 is determined as a first ray direction. Then three additional directions are randomly selected from the hemisphere, such as random directions 1208-1, 1208-2, 1208-3. In embodiments that determine that a specular direction should not be included, then four random directions may be selected from the hemisphere.

Referring back to FIG. 10, for pixel 1002, a set of sample directions (e.g., four sample directions) is identified. As described, one of the four sample directions may be a specular direction and the other three directions are random directions, or, alternatively, all four directions are random directions if no specular component should be included. For each of the four sample directions, a fixed-distance ray is cast. In one implementation, the fixed distance (L) may be about half the distance between probes in the fixed grid of probes. Each fixed-distance ray is cast to determine whether the fixed-distance ray intersects another object (or ground) before reaching the end of the fixed-distance ray. In the example shown in FIG. 10, rays labelled A and B did not intersect another object (or ground) before reaching the end of the fixed-distance ray; whereas, rays labelled C and D did intersect another object (or ground) before reaching the end of the fixed-distance ray. According to embodiments of the disclosure, because rays labelled A and B did not intersect another object (or ground) before reaching the end of the fixed-distance ray, the screen space data from the probes can be used to accumulate lighting information for these directions. For the directions corresponding to rays labelled C and D, screen space data is not available from the probes, so ray traced rays can be cast in these directions to obtain lighting information for these directions.

Then, for the location on the object corresponding to the pixel 1002, a set of eight (8) neighboring probes is identified. As described in FIG. 9, for each point in space, the point is located within a "cage" of eight probes. For the set of eight neighboring probes, the probes that can be reached from the location on the object corresponding to the pixel 1002 are identified based on the orientation of the surface at the location and other objects in the scene. In the example shown in FIG. 10, probes 1004 and 1006 can be reached from the location on the object corresponding to the pixel 1002; whereas, probes 1008 and 1010 cannot be reached from the location on the object corresponding to the pixel 1002, e.g., because they are behind a wall 1012. Also, it should be noted that just four probes are shown in FIG. 10 for clarity.

Once the set of neighboring probes (e.g., probes in the cage of eight probes) that can be reached is identified, the set of neighboring probes that can be reached is sampled for lighting information in the directions where screen space data is available (e.g., in the directions of rays A and B in the example in FIG. 10). As previously described, each probe stores direction-dependent radiance lighting information. For a first ray, such as ray A, the probes 1004 and 1006 (e.g., the probes in the cage of probes that can be reached) are sampled in the direction of ray A. The results are then accumulated, such by a weighted average based on the distance from the location on the object corresponding to pixel 1002 and the respective probes 1004, 1006. Similarly, for ray B, the probes 1004 and 1006 are sampled in the direction of ray B and the results are then accumulated.

The ray traced lighting results from directions corresponding to rays C and D are then accumulated with the accumulated lighting results from sampling the probes in the directions of ray A and ray B to produce a local occlusion value for the pixel. In one embodiment, accumulating the lighting information obtained from the different directions can be weighted based on how close the respective directions are to the specular direction when a specular component is utilized. In this manner, the local occlusion value includes diffuse components, and can also include a specular component in situations where a specular direction ray is included. Also, since screen space data is used to determine at least a portion of the local occlusion value, the number of fully ray traced rays can be minimized to reduce computational cost.

Figure 13:
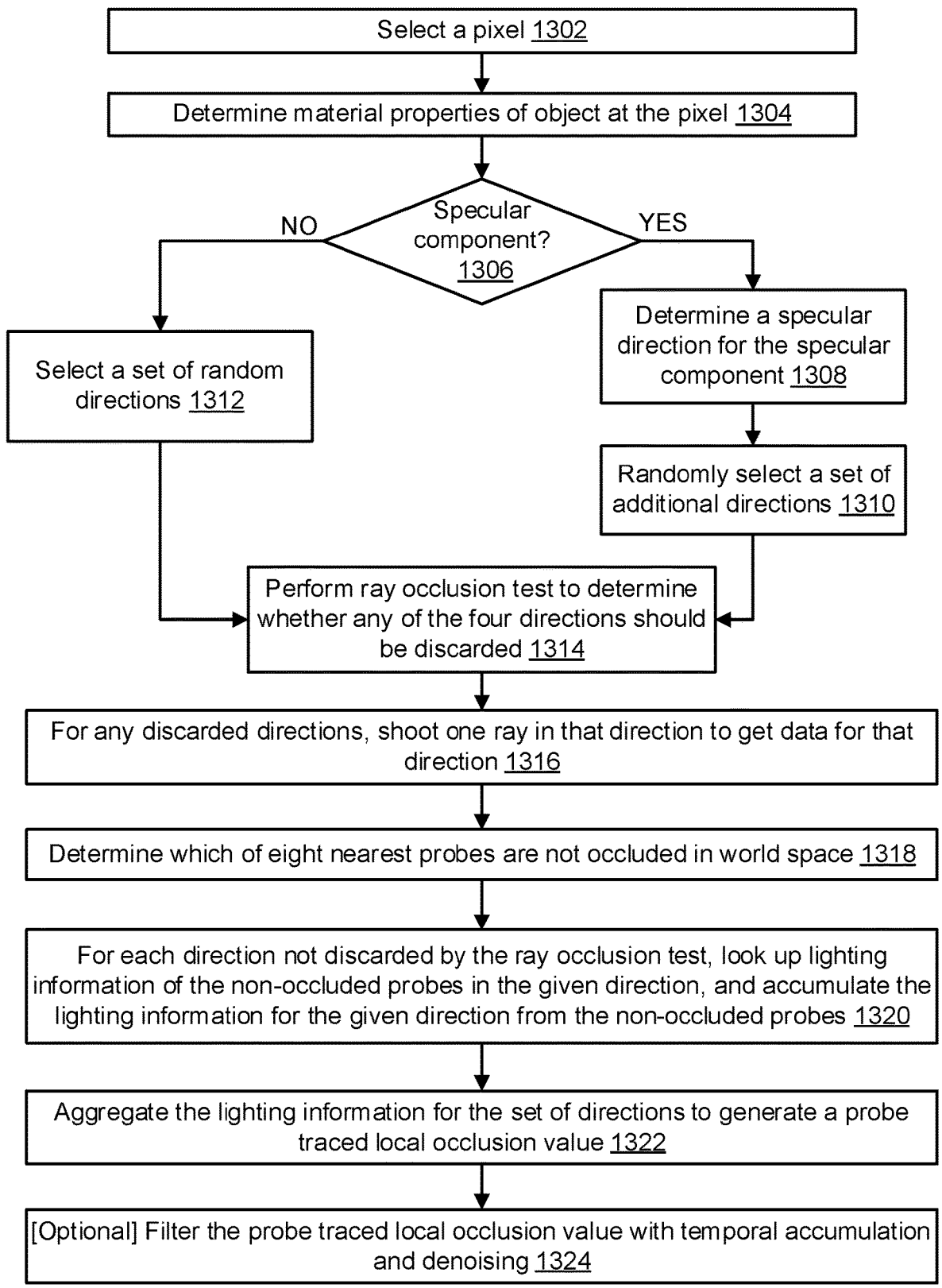
FIG. 13 is a flow diagram of method steps for probe traced local occlusion, according to one embodiment.

FIG. 13 is a flow diagram of method steps for probe traced local occlusion, according to one embodiment. In various implementations, the method can be performed by the processor 110, the graphics processor 116, or a combination of the processor 110 and the graphics processor 116.

As shown, the method begins at step 1302, where the processor selects a pixel to process. The pixel may be a pixel that is to be shaded. At step 1304, the processor determines material properties of an object at the pixel. The material properties may include a surface roughness of the object at the pixel.

At step 1306, the processor determines whether to include a specular component. In some implementations, determining whether to include a specular component is based on determining whether the surface roughness of the object at the pixel is below a roughness threshold.

If, at step 1306, the processor determines that a specular component should be included, then at step 1308, the processor determines a specular direction for the specular component. As previously described, the specular direction is based on a location of the light source, a location of a camera capturing an image of the scene, material properties of the surface, and an orientation of the surface. At step 1310, the processor randomly selects a set of additional directions. In one example, the set of additional directions includes three additional directions, although any number of additional directions may be used. The additional directions are limited by a hemisphere corresponding to an orientation of the surface of the object at the pixel.

If, at step 1306, the processor determines that a specular component should not be included, then at step 1312, the processor selects a set of random directions. The set of random directions is limited by the hemisphere corresponding to an orientation of the surface of the object at the pixel and does not include a specular direction. In one implementation, the set of random directions includes four randomly selected directions within the hemisphere.

At step 1314, the processor performs a ray occlusion test to determine whether any of the directions should be discarded. As described, a set of directions has been determined, where one or none of the directions is a specular direction. Performing the ray occlusion test comprises launching fixed-distance rays in each of the directions in the set of directions and determining whether the fixed-distance ray intersects another object (or ground) before reaching its length. Any directions corresponding to fixed-distance rays that intersect another object (or ground) are discarded.

In some implementations, if a direction is discarded for failing the ray occlusion test, a previous frame can be looked up to see whether that direction was discarded in the previous frame. If the direction was not discarded in the previous frame, the data from the previous frame can be reused for the current frame for that direction.

At step 1316, for any discarded directions (and/or discarded directions that did not have information from a previous frame), a full length traced ray can be launched in the direction to obtain lighting information for that direction.

At step 1318, the processor determines which of eight nearest probes are not occluded in world space. As described, each point in space is bound by a cage of the eight nearest probes in a grid of probes, where each probe includes directional radiance lighting information. Any of the eight nearest probes to the location corresponding to the pixel that are occluded and cannot be reached, based on the orientation of the surface and other objects in the scene, are discarded.

At step 1320, for each direction that was not discarded by the ray occlusion test, the processor looks up lighting information of the non-occluded probes in the given direction, and accumulates the lighting information for the given direction from the non-occluded probes. Accumulating the lighting information from the probes for a given direction can be weighted based on the distance from the location to the respective probes.

At step 1322, the processor aggregates the lighting information for the set of directions to generate a probe traced local occlusion value. As described, any directions that were not discarded by the ray occlusion test correspond to aggregated lighting information from the probes (see step 1320). For rays that were discarded by the ray occlusion test, a fully ray traced result is used for that direction (see step 1316). In some implementations, if a specular direction is included, aggregating the lighting information for the different directions is weighted based on how close the directions are to the specular direction.

At step 1324, the processor optionally filters the probe traced local occlusion value with temporal accumulation and denoising. In some embodiments, temporal accumulation may include blending the probe traced local occlusion value for the current frame with probe traced local occlusion values from one or more previous frames. Also, in some embodiments, the probe traced local occlusion value for a given pixel may be blended with the probe traced local occlusion values from nearby pixels, e.g., pixels on the same surface with similar object orientation.

The process in FIG. 13 can then be repeated for each pixel to be shaded.

Figure 14A:
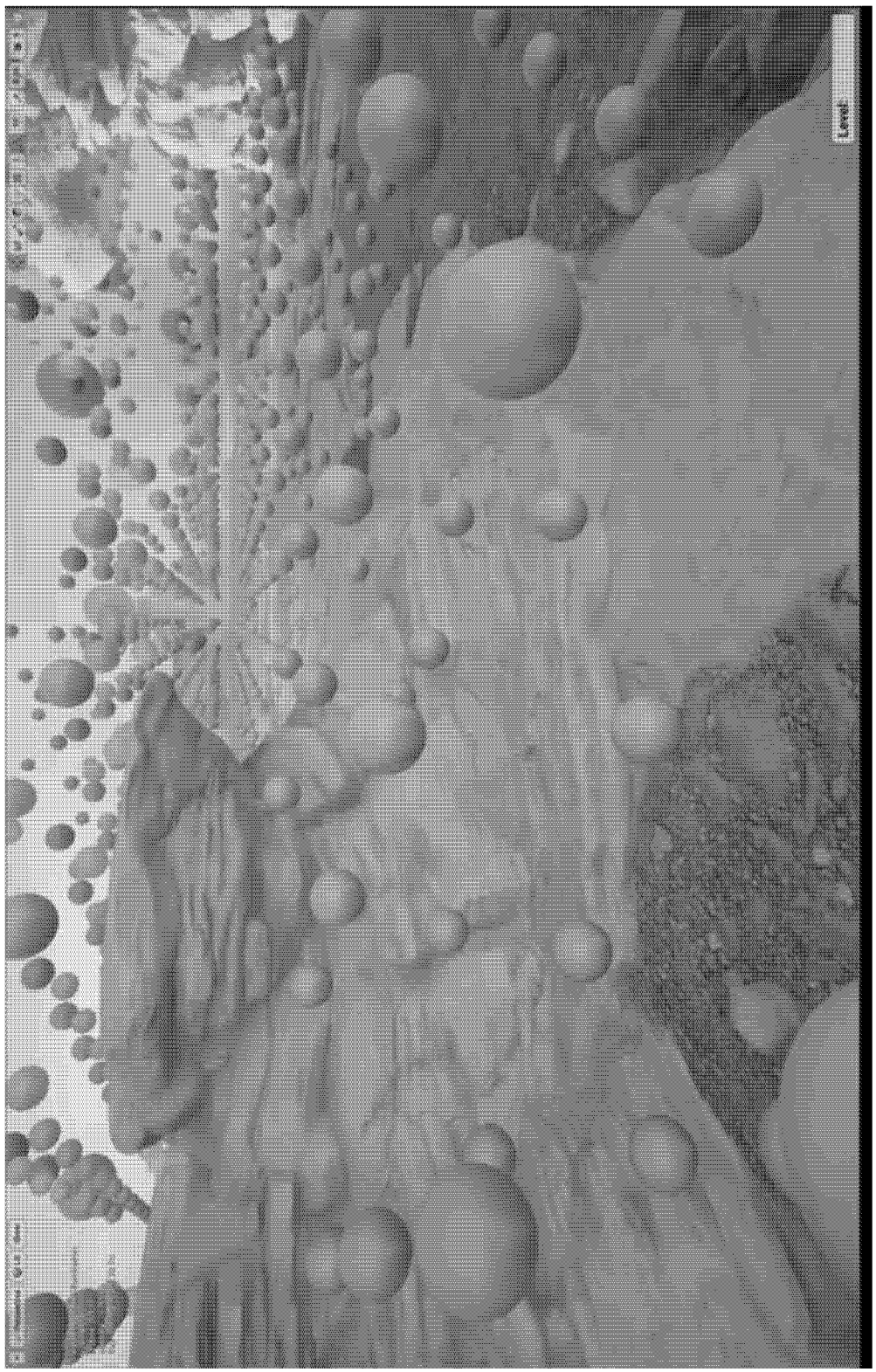
FIG. 14A is a screenshot illustrating diffuse probes overlaid on an image to be rendered, according to one embodiment.
Figure 14B:
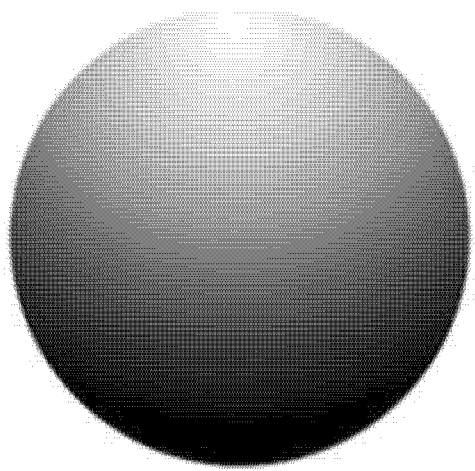
FIG. 14B is an example of a diffuse probe, according to one embodiment.

In an alternative embodiment, bent normals can be used for ray traced ambient occlusion. A bent normal, as used in this disclosure, is an average of all directions on an object corresponding to a pixel that are not occluded. In conventional DDGI approaches, the probes contain diffuse lighting information by accumulating lighting information from casting rays from the probes in random directions, e.g., by averaging the lighting information. These diffuse probes can be used in conjunction with bent normals according to some embodiments of the disclosure for ray traced ambient occlusion. FIG. 14A is a screenshot illustrating diffuse probes overlaid on an image to be rendered, according to one embodiment. The shading on the probes appears as a gradient (such as shown in FIG. 14B), as compared to the discrete directional lighting information (such as in the example in FIG. 8).

Figure 15:
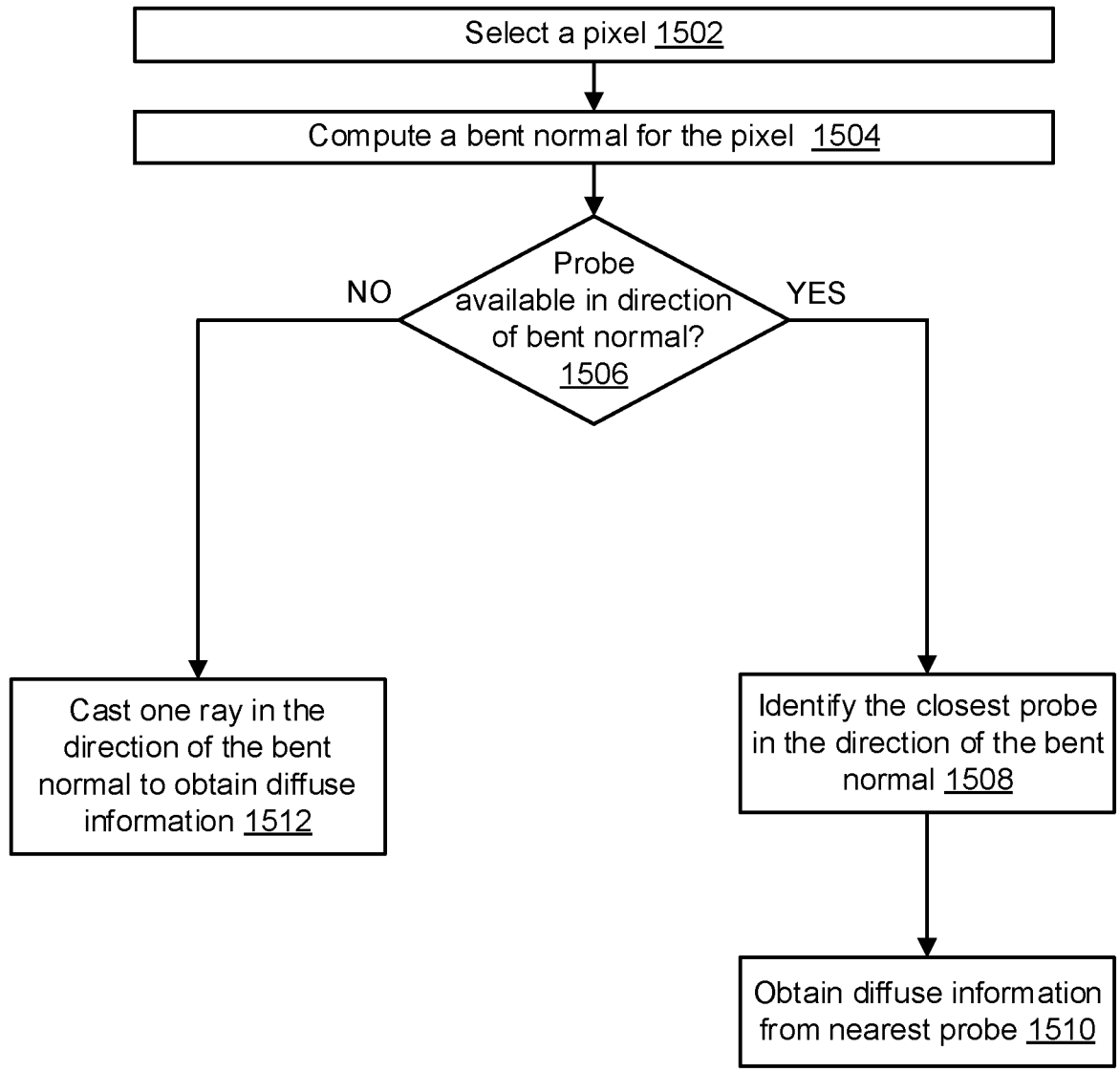
FIG. 15 is a flow diagram of method steps for ray traced ambient occlusion using bent normals, according to one embodiment.

FIG. 15 is a flow diagram of method steps for ray traced ambient occlusion using bent normals, according to one embodiment. In various implementations, the method can be performed by the processor 110, the graphics processor 116, or a combination of the processor 110 and the graphics processor 116.

As shown, the method begins at step 1502, where the processor selects a pixel to process. The pixel may be a pixel that is to be shaded. At step 1504, the processor computes a bent normal for a location on an object corresponding to the pixel. In one embodiment, the bent normal is an average of all directions that are not occluded by shooting fixed-distance rays in all directions.

At step 1506, the processor determines whether a probe is available in the direction of the bent normal. In this embodiment, the probes contain diffuse (irradiance) information. If, at step 1506, the processor determines that a probe is available in the direction of the bent normal, then at step 1508, the processor identifies the closest probe in the direction of the bent normal. At step 1510, the processor obtains diffuse information from nearest probe based on the direction of the bent normal.

If, at step 1506, the processor determines that no probe is available in the direction of the bent normal, then at step 1512, the processor casts one ray in the direction of the bent normal to obtain diffuse information for the pixel. The ray cast at step 1512 is a full length ray traced ray.

The process in FIG. 15 can be repeated for each pixel to be shaded. As such, in the custom ambient occlusion technique disclosed by this embodiment, a bent normal is calculated to bridge the gap between the probe data and the localized geometry, as it indicates which direction each respective pixel can see out. This helps calculate the average bounce diffuse and thereby acquire information about instances of local light bleeding. Using a bent normal, in turn, is used also to determine situations where there is a lack of available probe data, and a fully ray traced ray can be launched in those instances to obtain an ambient occlusion value for the pixel.

Embodiments of the disclosure also provide a technique for ray traced reflections. According to embodiments of the disclosure, the probe data used to compute ambient occlusion may contain enough specular data to represent reflections throughout most of the environment, typically leaving only high gloss surfaces with a high specular component (e.g., water, mirrors) to be ray traced for better reflective detail. To further save on ray tracing costs, in some embodiments, each shaded pixel that is determined to have a high specular component is further analyzed to determine whether a brightness threshold is met. The threshold is an indication that a ray cast for the purposes of reflections would provide a perceivable benefit to the pixel. As such, ray tracing is performed only on the pixels that would have a perceivable benefit over screen space reflections that is greater than, for example, 10% (measured in terms of brightness). This is possible because this step occurs later in the rendering pass (as a whole), so there is already non-ray traced information that can be used as a reference. When a ray traced reflection is needed on a pixel, a long, fully ray traced ray is cast and is used to provide a highly detailed reflection. The previously mentioned occlusion rays cast use a lower cost short, fixed-distance ray casts. However, in some embodiments, the benefits of the ray occlusion buffer carry over to ray traced reflections, as the directionality information from the short range rays can be utilized to blur reflections produced by the long range rays.

Figure 16:
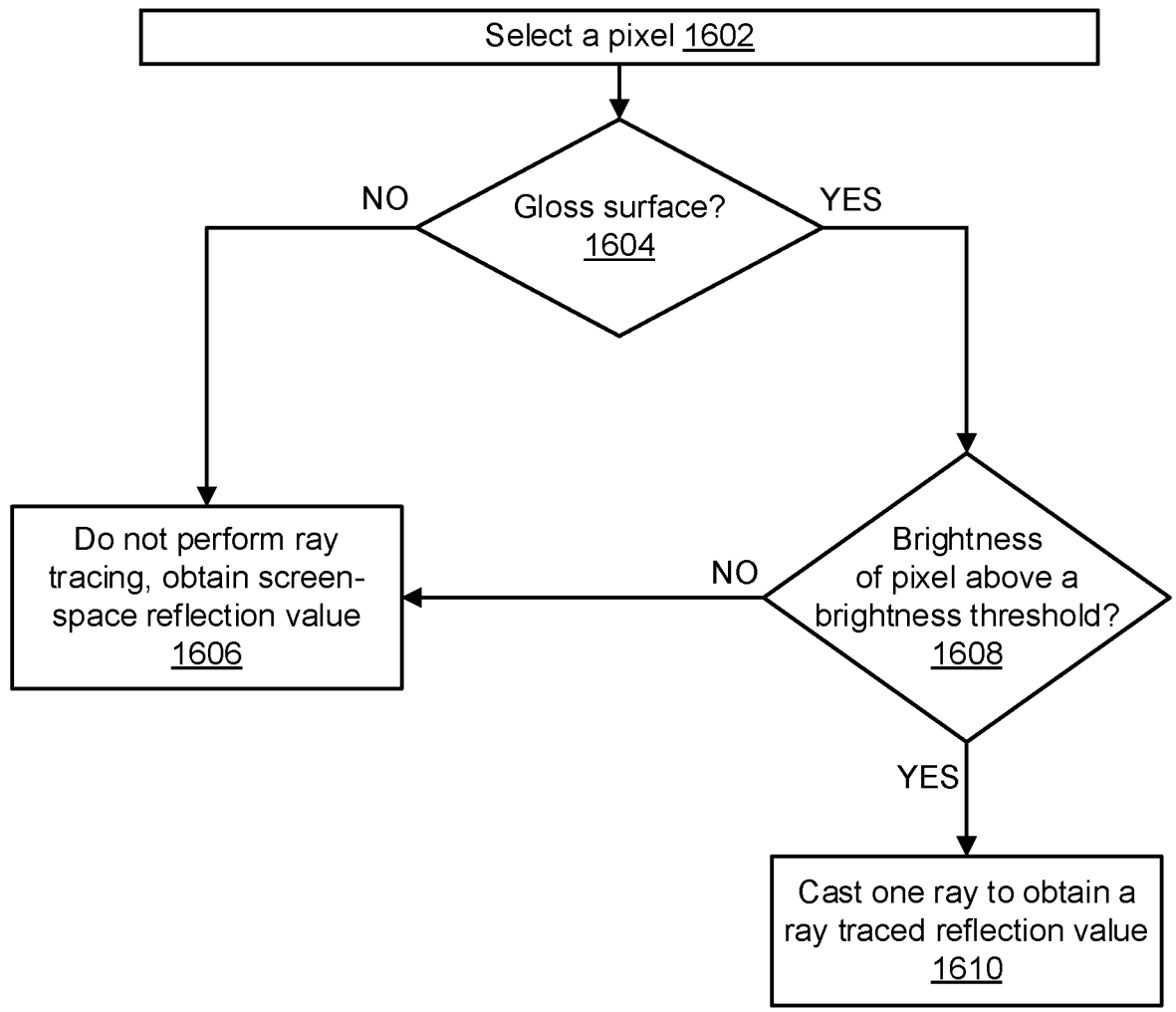
FIG. 16 is a flow diagram of method steps for ray traced reflections, according to one embodiment.

FIG. 16 is a flow diagram of method steps for ray traced reflections, according to one embodiment. In various implementations, the method can be performed by the processor 110, the graphics processor 116, or a combination of the processor 110 and the graphics processor 116.

As shown, the method begins at step 1602, where the processor selects a pixel to process. The pixel may be a pixel that is to be shaded. At step 1604, the processor determines whether a surface of an object corresponding to the pixel is a high gloss surface. In one implementation, determining whether a surface is a high gloss surfaces involves examining a surface roughness value of the surface. In one implementation, determining whether a surface is a high gloss surfaces includes determining whether the surface roughness value is below a roughness threshold (for example, the surface roughness threshold may be 0.3 on a scale of 0.0 to 1.0).

If, at step 1604, the processor determines that the surface of the object corresponding to the pixel is not a high gloss surface, then at step 1606, ray tracing is bypassed, and the processor obtains a screen-space reflection value for the pixel. In various embodiments, the methods of FIG. 13 or FIG. 15 can be used to obtain the screen-space reflection value.

If, at step 1604, the processor determines that the surface of the object corresponding to the pixel is a high gloss surface, then at step 1608, the processor determines whether a brightness of the pixel is above a brightness threshold. If processor determines that the brightness of the pixel is not above the brightness threshold, then the method proceeds to step 1606, where ray tracing is bypassed, and the processor obtains a screen-space reflection value for the pixel.

If, at step 1608, processor determines that the brightness of pixel is above the brightness threshold, then at step 1610, the processor casts one ray (e.g., a fully ray traced ray) to obtain a ray traced reflection value for the pixel. The ray traced reflection value can be blended with the screen-space reflection value computing using the methods of FIG. 13 of FIG. 15 to obtain a final result.

In some embodiments, the method of FIG. 16 is repeated for each pixel to be shaded. Also, in some embodiments, pixels corresponding to objects that are behind transparent surfaces can be skipped, where a single pass technique can be used for ray traced reflections of translucent surfaces (e.g., windows). This technique only accounts for the pixels reflecting light and not any pixels behind the translucent surface (e.g., inside a window). This gives a deeper sense of immersion without overwhelming the ray tracing budget. In one embodiment, any geometry that is tagged as translucent or transparent is rendered. These surfaces are tagged as needed reflection. When it comes time to compute reflections, pixels behind the translucent or transparent surface do not get ray traced reflections.

Figure 17:
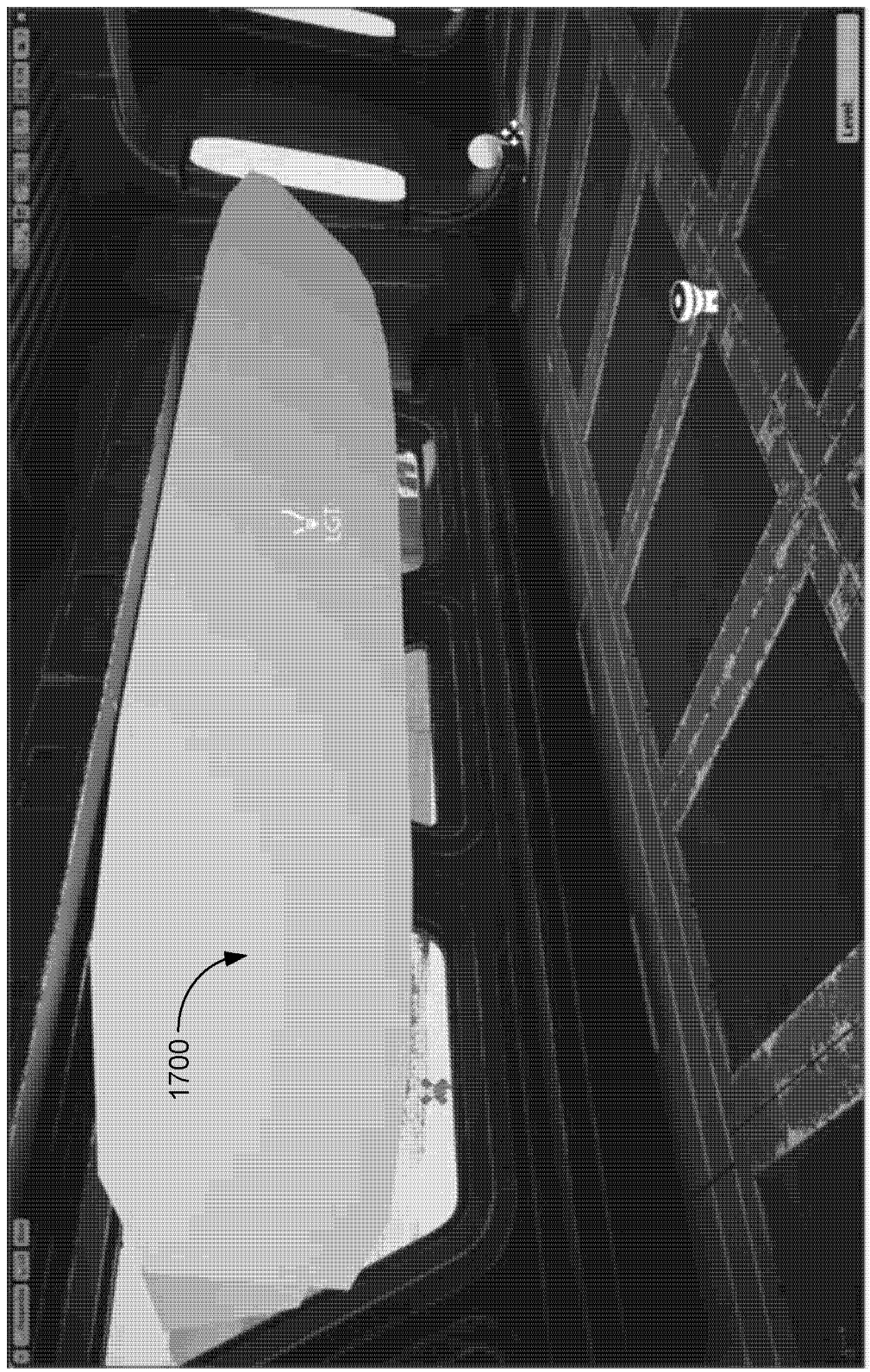
FIG. 17 is a screenshot illustrating an emissive card for additional light sensed by the probes, according to one embodiment.

Additionally, in some embodiments, emissive "cards" can be strategically placed in the scene to help boost the lighting data in some areas going into the probes. This can help illuminate rooms with windows or other areas requiring more light data (such as on the other side of a translucent surface) without overwhelming the ray tracing budget. In these embodiments, the emissive cards generate light that can only be seen by the probes. FIG. 17 is a screenshot illustrating an emissive card 1700 for additional light sensed by the probes, according to one embodiment.

In some embodiments, to further improve costs, the rate of updates of the probes (e.g., so-called "luminance velocity") can also be throttled to save on unnecessarily updating the lighting data stored in the probes. In one implementation, when new probes are added or existing ones are updated as the viewport moves around the world space, the rate of updates to the visible probes can be adjusted to meet a cost threshold. Furthermore, in some embodiments, only the probes that require updating are updated. To implement this, for a given probe, a rate of change of the average luminance of the given probe is compared for a given frame and the previous frame. If the rate of change of the average luminance is below a threshold, updating the lighting data in the probe can be skipped, and the lighting data from the previous frame is reused for the given frame for the probe.

Figure 18:
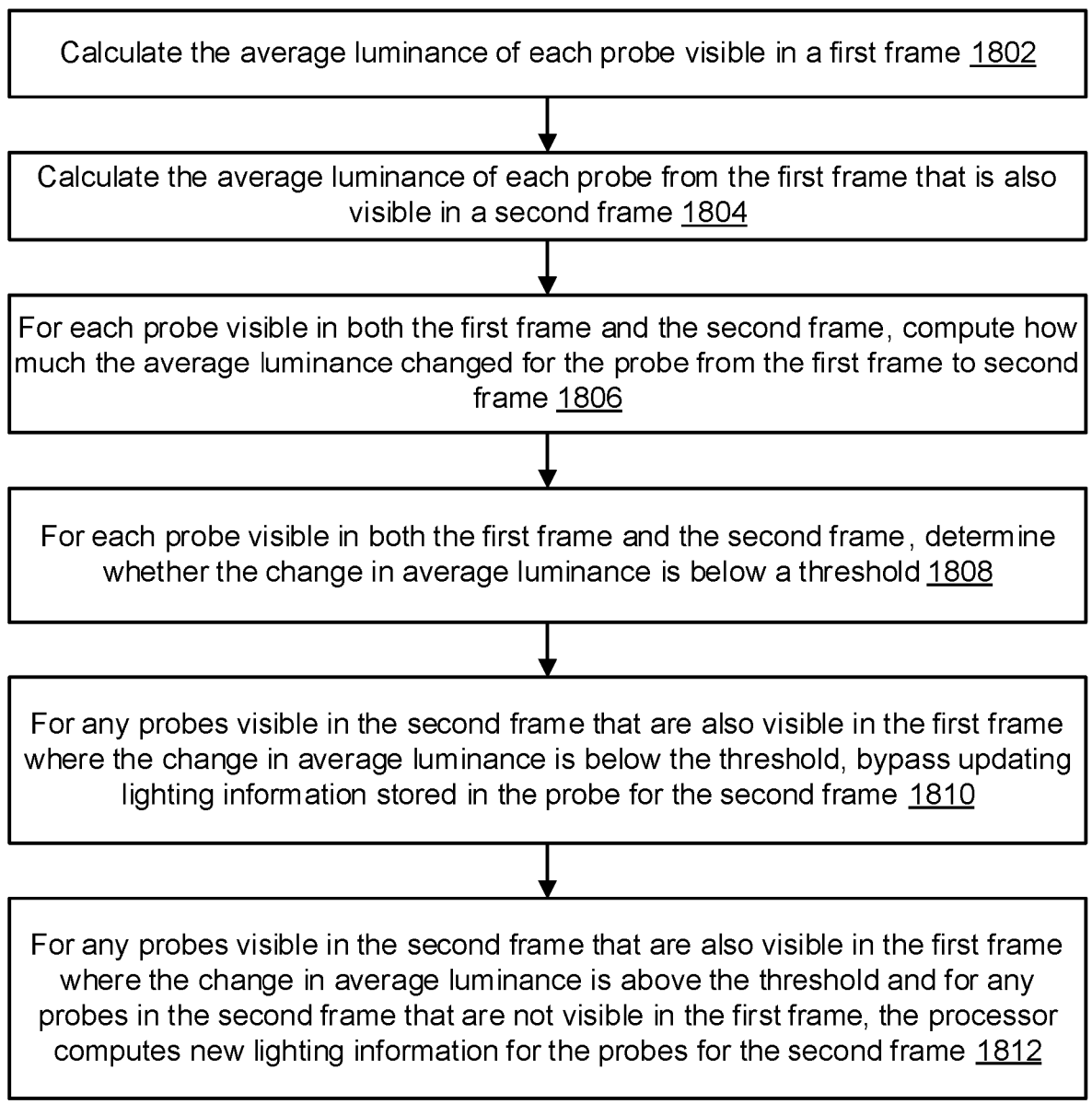
FIG. 18 is a flow diagram of method steps for updating the lighting information stored in probes, according to one embodiment.

FIG. 18 is a flow diagram of method steps for updating the lighting information stored in probes, according to one embodiment. In various implementations, the method can be performed by the processor 110, the graphics processor 116, or a combination of the processor 110 and the graphics processor 116.

As shown, the method begins at step 1802, where the processor calculates an average luminance of each probe visible in a first frame. At step 1804, the processor calculates the average luminance of each probe from the first frame that is also visible in a second frame. The second frame may be the next frame sequentially after the first frame. At step 1806, for each probe visible in both the first frame and the second frame, the processor computes how much the average luminance changed for the probe from the first frame to the second frame.

At step 1808, the processor determines, for each probe visible in both the first frame and the second frame, whether the change in average luminance is below a threshold.

At step 1810, for any probes visible in the second frame that are also visible in the first frame where the change in average luminance is below the threshold, the processor bypasses updating lighting information stored in the probe for the second frame. In this case, the lighting information for such probes from the first frame can be reused for the second frame. In some embodiments, the probes that are bypassed for updating at step 1810 may be tagged for no updating for some number of subsequent frames, such as 16 or 32 frames.

At step 1812, for any probes visible in the second frame that are also visible in the first frame where the change in average luminance is above the threshold and for any probes in the second frame that are not visible in the first frame, the processor computes new lighting information for the probes for the second frame.

In sum, embodiments of the disclosure result in a hybrid of screen space ambient occlusion (SSAO) and ray traced ambient occlusion (RTAO) as well as hybrid screen space reflections (SSR) and ray traced reflections (RTR) that closely resemble the quality of a fully ray traced approach. This improves shadows around the edges of the screen and around objects that invoke depth occlusion, both of which are cases where conventional screen space ambient occlusion typically fails, and are remedied by embodiments of the disclosure at a lower cost than with other existing approaches. Also, rather than just scaling down color values like in traditional ambient occlusion methods, the disclosed embodiments are able to perform color shifting, which provides a result that is visibility close to full ray tracing, but at a much lower cost.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (e.g., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating an occlusion value for a pixel, the method comprising:
   selecting, by one or more processors, a pixel in an image of a scene;
   identifying, by the one or more processors, a set of directions from a location on an object corresponding to the pixel based on an orientation of a surface of the object at the location, wherein the set of directions includes at least two directions;
   for each direction of the set of directions, casting, by the one or more processors, a fixed-distance ray in the direction and determining whether the fixed-distance ray intersects another object along a length of the fixed-distance ray, wherein a length of the fixed-distance ray is the same for each direction of the set of directions;
   in response to determining that the fixed-distance ray for a first direction of the set of directions does not intersect another object along the length of the fixed-distance ray, obtaining, by the one or more processors, a first occlusion value for the pixel from at least one lighting probe based on the first direction, wherein the length of the fixed-distance ray that is cast in each direction of the set of directions is based on a distance between lighting probes in a grid of lighting probes;
   in response to determining the fixed-distance ray for a second direction of the set of directions intersects another object along the length of the fixed-distance ray, obtaining, by the one or more processors, a second occlusion value for the pixel based on performing ray tracing in the second direction from the location on the object corresponding to the pixel; and
   accumulating, by the one or more processors, the first occlusion value and the second occlusion value to obtain the occlusion value for the pixel.

2. The method according to claim 1, wherein lighting probes are arranged in a grid pattern in three-dimensional space at fixed locations, wherein each probe includes direction-dependent lighting information.

3. The method according to claim 2, wherein, for a given lighting probe, the direction-dependent lighting information is obtained by casting rays in random direction from the given lighting probe.

4. The method according to claim 1, further comprising:
   computing a bent normal for the location on the object corresponding to the pixel, wherein the bent normal is an average of all directions for which a fixed-distance ray does not intersect another object in a plurality of directions from the location on the object;
   determining that screen space occlusion data is available in the direction of the bent normal; and
   obtaining a third occlusion value for the pixel from at least one lighting probe based on the direction of the bent normal.

5. The method according to claim 1, further comprising:
   determining a material property of the object corresponding to the pixel, wherein the material property comprises a surface roughness value of the object at the pixel, wherein the set of directions includes random directions, and wherein the set of directions includes a specular direction in response to the surface roughness value of the object at the pixel being less than a specular roughness threshold;
   for each direction in the set of directions in which the fixed-distance ray for the direction does not intersect another object along the length of the fixed-distance ray, obtaining a screen space reflection value for the direction based on one or more lighting probes that include directional lighting information;

for each direction in the set of directions in which the fixed-distance ray for the direction does intersect another object along the length of the fixed-distance ray, obtaining a ray traced space reflection value for the direction based on casting a full length ray traced ray in the direction; and accumulating the screen space reflection values and the ray traced space reflection values corresponding to the directions in the set of directions to obtain the occlusion value for the pixel.

6. The method according to claim 5, wherein the random directions are limited by a hemisphere corresponding to the orientation of the surface of the object at the location corresponding to the pixel.

7. The method according to claim 5, wherein obtaining the screen space reflection value for a given direction in the set of directions based on the one or more lighting probes comprises:

identifying locations of a set of eight nearest probes relative to the location on the object corresponding to the pixel;

determining which of the eight nearest probes is reachable from the location on the object corresponding to the pixel based on the orientation of the surface of the object at the location corresponding to the pixel and other objects in the scene;

sampling the probes among the eight nearest probes that are reachable from the location on the object corresponding to the pixel in the given direction to obtain directional lighting information; and aggregating the directional lighting information in the given direction based on sampling the probes among the eight nearest probes that are reachable from the location on the object corresponding to the pixel.

8. The method according to claim 5, wherein the set of directions includes the specular direction, and accumulating the screen space reflection values and the ray traced space reflection values corresponding to the directions in the set of directions comprises:

computing a weighted average among the screen space reflection values and the ray traced space reflection values corresponding to the directions in the set of directions, wherein greater weights are assigned to screen space reflection values and ray traced space reflection values corresponding to directions closer to the specular direction.

9. The method according to claim 5, further comprising:
determining that the surface roughness value of the object at the pixel corresponds to a high gloss surface based on determining that the surface roughness value is below a high gloss surface threshold;

determining that the location on the object corresponding to the pixel corresponds to a brightness value that exceeds a brightness threshold;

based on determining that the surface roughness value of the object at the pixel corresponds to a high gloss surface and based on determining that location on the object corresponding to the pixel corresponds to a brightness value that exceeds the brightness threshold, launching a reflection ray from the location on the object corresponding to the pixel to determine a reflection value for the pixel; and blending the occlusion value for the pixel and the reflection value for the pixel to obtain an updated occlusion value.

10. The method according to claim 1, further comprising:
calculating an average luminance of each lighting probe visible in a first frame;

calculating the average luminance of each lighting probe visible in a second frame that is also visible in the first frame, wherein the second frame is sequentially after the first frame;

for each lighting probe visible in both the first frame and the second frame, computing how much the average luminance changed for the lighting probe from the first frame to the second frame;

for each lighting probe visible in both the first frame and the second frame, determining whether the change in average luminance is below a luminance threshold;

for any lighting probes visible in the second frame that are also visible in the first frame where the change in average luminance is below the luminance threshold, bypassing updating lighting information stored in the lighting probe for the second frame and reusing the lighting information for the lighting probe from the first frame in the second frame; and for any lighting probes visible in the second frame that are also visible in the first frame where the change in average luminance is above the luminance threshold and for any lighting probes in the second frame that are not visible in the first frame, computing updated lighting information for the lighting probes for the second frame.

11. The method according to claim 1, wherein the length of the fixed-distance ray that is cast in each direction of the set of directions is half the distance between the lighting probes in the grid of lighting probes.

12. A non-transitory computer-readable storage medium storing instructions that, when executed by one or more processors, cause a computing device to generate an occlusion value for a pixel, by performing the steps of:

selecting a pixel in an image of a scene;

identifying a set of directions from a location on an object corresponding to the pixel based on an orientation of a surface of the object at the location, wherein the set of directions includes at least two directions;

for each direction of the set of directions, casting a fixed-distance ray in the direction and determining whether the fixed-distance ray intersects another object along a length of the fixed-distance ray, wherein a length of the fixed-distance ray is the same for each direction of the set of directions;

in response to determining that the fixed-distance ray for a first direction of the set of directions does not intersect another object along the length of the fixed-distance ray, obtaining a first occlusion value for the pixel from at least one lighting probe based on the first direction, wherein the length of the fixed-distance ray that is cast in each direction of the set of directions is based on a distance between lighting probes in a grid of lighting probes;

in response to determining the fixed-distance ray for a second direction of the set of directions intersects another object along the length of the fixed-distance ray, obtaining a second occlusion value for the pixel based on performing ray tracing in the second direction from the location on the object corresponding to the pixel; and accumulating the first occlusion value and the second occlusion value to obtain the occlusion value for the pixel.

13. The computer-readable storage medium according to claim 12, the steps further comprising:

computing a bent normal for the location on the object corresponding to the pixel, wherein the bent normal is an average of all directions for which a fixed-distance ray does not intersect another object in a plurality of directions from the location on the object;

determining that screen space occlusion data is available in the direction of the bent normal; and obtaining a third occlusion value for the pixel from at least one lighting probe based on the direction of the bent normal.

14. The computer-readable storage medium according to claim 12, the steps further comprising:

determining a material property of the object corresponding to the pixel, wherein the material property comprises a surface roughness value of the object at the pixel, wherein the set of directions includes random directions, and wherein the set of directions includes a specular direction in response to the surface roughness value of the object at the pixel being less than a specular roughness threshold;

for each direction in the set of directions in which the fixed-distance ray for the direction does not intersect another object along the length of the fixed-distance ray, obtaining a screen space reflection value for the direction based on one or more lighting probes that include directional lighting information;

for each direction in the set of directions in which the fixed-distance ray for the direction does intersect another object along the length of the fixed-distance ray, obtaining a ray traced space reflection value for the direction based on casting a full length ray traced ray in the direction; and accumulating the screen space reflection values and the ray traced space reflection values corresponding to the directions in the set of directions to obtain the occlusion value for the pixel.

15. The computer-readable storage medium according to claim 14, wherein obtaining the screen space reflection value for a given direction in the set of directions based on the one or more lighting probes comprises:

identifying locations of a set of eight nearest probes relative to the location on the object corresponding to the pixel;

determining which of the eight nearest probes is reachable from the location on the object corresponding to the pixel based on the orientation of the surface of the object at the location corresponding to the pixel and other objects in the scene;

sampling the probes among the eight nearest probes that are reachable from the location on the object corresponding to the pixel in the given direction to obtain directional lighting information; and aggregating the directional lighting information in the given direction based on sampling the probes among the eight nearest probes that are reachable from the location on the object corresponding to the pixel.

16. The computer-readable storage medium according to claim 14, wherein the set of directions includes the specular direction, and accumulating the screen space reflection values and the ray traced space reflection values corresponding to the directions in the set of directions comprises:

computing a weighted average among the screen space reflection values and the ray traced space reflection values corresponding to the directions in the set of directions, wherein greater weights are assigned to screen space reflection values and ray traced space reflection values corresponding to directions closer to the specular direction.

17. The computer-readable storage medium according to claim 14, the steps further comprising:

determining that the surface roughness value of the object at the pixel corresponds to a high gloss surface based on determining that the surface roughness value is below a high gloss surface threshold;

determining that the location on the object corresponding to the pixel corresponds to a brightness value that exceeds a brightness threshold;

based on determining that the surface roughness value of the object at the pixel corresponds to a high gloss surface and based on determining that location on the object corresponding to the pixel corresponds to a brightness value that exceeds the brightness threshold, launching a reflection ray from the location on the object corresponding to the pixel to determine a reflection value for the pixel; and blending the occlusion value for the pixel and the reflection value for the pixel to obtain an updated occlusion value.

18. The computer-readable storage medium according to claim 12, the steps further comprising:

calculating an average luminance of each lighting probe visible in a first frame;

calculating the average luminance of each lighting probe visible in a second frame that is also visible in the first frame, wherein the second frame is sequentially after the first frame;

for each lighting probe visible in both the first frame and the second frame, computing how much the average luminance changed for the lighting probe from the first frame to the second frame;

for each lighting probe visible in both the first frame and the second frame, determining whether the change in average luminance is below a luminance threshold;

for any lighting probes visible in the second frame that are also visible in the first frame where the change in average luminance is below the luminance threshold, bypassing updating lighting information stored in the lighting probe for the second frame and reusing the lighting information for the lighting probe from the first frame in the second frame; and for any lighting probes visible in the second frame that are also visible in the first frame where the change in average luminance is above the luminance threshold and for any lighting probes in the second frame that are not visible in the first frame, computing updated lighting information for the lighting probes for the second frame.

19. A device for generating an occlusion value for a pixel, the device comprising:

a memory storing instructions; and one or more processors configured to the execute the instructions to cause the device to:

select a pixel in an image of a scene;

identify a set of directions from a location on an object corresponding to the pixel based on an orientation of a surface of the object at the location, wherein the set of directions includes at least two directions;

for each direction of the set of directions, cast a fixed-distance ray in the direction and determining whether the fixed-distance ray intersects another object along a length of the fixed-distance ray, wherein a length of the fixed-distance ray is the same for each direction of the set of directions;

in response to determining that the fixed-distance ray for a first direction of the set of directions does not intersect another object along the length of the fixed-distance ray, obtain a first occlusion value for the pixel from at least one lighting probe based on the first direction, wherein the length of the fixed-distance ray that is cast in each direction of the set of directions is based on a distance between lighting probes in a grid of lighting probes;

in response to determining the fixed-distance ray for a second direction of the set of directions intersects another object along the length of the fixed-distance ray, obtain a second occlusion value for the pixel based on performing ray tracing in the second direction from the location on the object corresponding to the pixel; and accumulate the first occlusion value and the second occlusion value to obtain the occlusion value for the pixel.

20. The device according to claim 19, wherein the one or more processors executing the instructions further causes the device to:

compute a bent normal for the location on the object corresponding to the pixel, wherein the bent normal is an average of all directions for which a fixed-distance ray does not intersect another object in a plurality of directions from the location on the object;

determine that screen space occlusion data is available in the direction of the bent normal; and obtain a third occlusion value for the pixel from at least one lighting probe based on the direction of the bent normal.

* * * * *